(12) United States Patent
A et al.

(10) Patent No.: US 11,075,805 B1
(45) Date of Patent: Jul. 27, 2021

(54) BUSINESS POLICY MANAGEMENT FOR SELF-DRIVING NETWORK

(71) Applicant: Juniper Networks, Inc., Sunnyvale, CA (US)

(72) Inventors: Chandrasekhar A, Bangalore (IN); Premchandar N, Bangalore (IN); Jayanthi R, Coimbatore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/831,607

(22) Filed: Mar. 26, 2020

Related U.S. Application Data

(60) Provisional application No. 62/984,975, filed on Mar. 4, 2020, provisional application No. 62/838,019, filed on Apr. 24, 2019.

(51) Int. Cl.
*G06F 15/177* (2006.01)
*H04L 12/24* (2006.01)
*H04L 29/06* (2006.01)

(52) U.S. Cl.
CPC ........ *H04L 41/082* (2013.01); *H04L 63/0272* (2013.01)

(58) Field of Classification Search
CPC .......................... H04L 41/082; H04L 63/0272
See application file for complete search history.

(56) References Cited

U.S. PATENT DOCUMENTS

| | | | |
|---|---|---|---|
| 7,636,771 B2 | 12/2009 | Torii | |
| 7,870,238 B2 | 1/2011 | Pusateri et al. | |
| 8,156,207 B2 | 4/2012 | Wood et al. | |
| 8,386,593 B1 | 2/2013 | Gao et al. | |
| 8,737,993 B2 | 5/2014 | Alves et al. | |
| 8,782,182 B2 | 7/2014 | Chaturvedi et al. | |
| 8,819,202 B1 | 8/2014 | Carolan et al. | |
| 8,849,973 B2 | 9/2014 | Leib et al. | |
| 8,869,236 B1 | 10/2014 | Tonogai et al. | |

(Continued)

FOREIGN PATENT DOCUMENTS

WO    2007140337 A2    12/2007

OTHER PUBLICATIONS

U.S. Appl. No. 16/400,936, filed May 1, 2019, naming inventors Ratkovic et al.

(Continued)

*Primary Examiner* — Richard G Keehn
(74) *Attorney, Agent, or Firm* — Shumaker & Sieffert, P.A.

(57) ABSTRACT

A controller device manages a plurality of network devices. The controller device includes one or more processing units configured to receive an indication of a stateful intent, the data structure including a plurality of nodes and a plurality of edges, each node of the plurality of nodes being representative of a respective network device of the plurality of network devices. The one or more processing units are configured to determine, using an abstract function configured at a node of the plurality of nodes, a stateless intent for implementing the stateful intent and generate low level configuration data for the plurality of network devices based on the stateless intent. The one or more processing units are configured to interface with one or more of the plurality of network devices to configure the one or more of the plurality of network devices with the low level configuration data.

20 Claims, 15 Drawing Sheets

(56) References Cited

U.S. PATENT DOCUMENTS

| | | |
|---|---|---|
| 9,037,969 B2 | 5/2015 | Wolff-Petersen et al. |
| 10,063,428 B1 | 8/2018 | Karam et al. |
| 10,277,461 B1 | 4/2019 | A et al. |
| 10,313,206 B1 | 6/2019 | Karam et al. |
| 10,333,776 B2 | 6/2019 | Karam et al. |
| 10,374,872 B2 | 8/2019 | Ratkovic et al. |
| 10,389,573 B2 | 8/2019 | Karam et al. |
| 10,516,761 B1 | 12/2019 | A et al. |
| 10,558,542 B1 | 2/2020 | A et al. |
| 10,630,540 B2 | 4/2020 | Karam et al. |
| 10,756,983 B2 | 8/2020 | Ratkovic et al. |
| 2002/0112053 A1 | 8/2002 | Christensen et al. |
| 2002/0178380 A1 | 11/2002 | Wolf et al. |
| 2004/0059812 A1 | 3/2004 | Assa |
| 2005/0091068 A1 | 4/2005 | Ramamoorthy |
| 2006/0080425 A1 | 4/2006 | Wood et al. |
| 2006/0241931 A1 | 10/2006 | Abu el Ata et al. |
| 2007/0130192 A1 | 6/2007 | Bolder et al. |
| 2007/0150561 A1 | 6/2007 | Courtney |
| 2009/0059814 A1 | 3/2009 | Nixon et al. |
| 2009/0198797 A1 | 8/2009 | Wang et al. |
| 2009/0282129 A9 | 11/2009 | Tindal |
| 2010/0293364 A1 | 11/2010 | Maini |
| 2010/0306275 A1 | 12/2010 | Maheshwari et al. |
| 2013/0060929 A1 | 3/2013 | Koponen et al. |
| 2014/0200858 A1 | 7/2014 | Chatow et al. |
| 2015/0015376 A1 | 1/2015 | Jenkins |
| 2015/0188774 A1 | 7/2015 | Nadaf et al. |
| 2015/0248487 A1 | 9/2015 | Baranowski et al. |
| 2015/0379409 A1 | 12/2015 | Hu et al. |
| 2016/0342510 A1 | 11/2016 | Pani |
| 2016/0344772 A1 | 11/2016 | Monahan et al. |
| 2017/0109907 A1 | 4/2017 | Hamedani |
| 2017/0331828 A1 | 11/2017 | Caldera et al. |
| 2018/0137155 A1 | 5/2018 | Majumdar |
| 2018/0210927 A1 | 7/2018 | Karam et al. |
| 2019/0173805 A1* | 6/2019 | Balan .................... H04L 41/082 |
| 2019/0238423 A1 | 8/2019 | Karam et al. |
| 2019/0306015 A1 | 10/2019 | Ratkovic et al. |
| 2019/0319830 A1 | 10/2019 | Karam et al. |
| 2020/0213189 A1 | 7/2020 | Karam et al. |
| 2020/0274772 A1* | 8/2020 | A ......................... H04L 41/0893 |
| 2020/0313957 A1* | 10/2020 | A ........................... H04L 41/082 |
| 2020/0313980 A1* | 10/2020 | A ........................... H04L 41/082 |
| 2020/0326924 A1* | 10/2020 | A ........................... H04L 41/082 |
| 2020/0328949 A1 | 10/2020 | Ratkovic et al. |
| 2020/0344171 A1* | 10/2020 | Sharma ............... H04L 63/0254 |

OTHER PUBLICATIONS

U.S. Appl. No. 16/360,660, filed Mar. 21, 2019, naming inventors Rachamadugu et al.

U.S. Appl. No. 17/104,804, filed Nov. 25, 2020, naming inventors Hafeez et al.

Harrington et al., "An Architecture for Describing Simple Network Management Protocol (SNMP) Management Frameworks," Network Working Group, RFC 3411, Dec. 2002, 65 pp.

Prakash et al., "PGA: Using Graphs to Express and Automatically Reconcile Network Policies," SIGCOMM '15: Proceedings of the 2015 ACM Conference on Special Interest Group on Data Communication, Aug. 2015, pp. 29-42, https://doi.org/10.1145/2785956.2787506, 14 pp.

* cited by examiner

BUSINESS POLICY MANAGEMENT FOR SELF-DRIVING NETWORK

This Application claims the benefit of U.S. Provisional Patent Application 62/838,019, filed Apr. 24, 2019 and U.S. Provisional Patent Application 62/984,975, filed Mar. 4, 2020, the entire content of each of which is hereby incorporated by reference

TECHNICAL FIELD

This disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as layer three virtual private network (L3VPN), virtual private local area network service (VPLS), and peer-to-peer (P2P) services. Other services include network configuration services, such as Dot1q virtual local area network (VLAN) service. Network management systems (NMSs) and NMS devices, also referred to as controllers or controller devices, may support these services such that an administrator can easily create and manage these high-level network configuration services.

SUMMARY

In general, this disclosure describes techniques for managing network devices. A network management system (NMS) device, also referred to herein as a controller device, may configure business policies, or simply "policies." In particular, user configuration of devices may be referred to as "intents." Intents may be represented as intent models, which may be modeled using a data structure, for example, such as, but not limited to, a unified graph model. Intent data models may be represented as connected graphs, so that business policies can be implemented across intent models. For example, data models may be represented using connected graphs having vertices connected with has-edges and reference (ref) edges. Controller devices may model intent models as unified graph models, such that the intend models can be represented as connected. In this manner, business policies can be implemented across intent models.

User intents can be categorized as business intents or stateless intents. Business intents, or stateful intents, may be resolved based on the current state of a network. Business intents may include, for example, a data throughput. Stateless intents may be fully declarative ways of describing an intended network/compute/storage state, without concern for a current network state. Stateless intents may include, for example, a virtual private network (VPN) connection between two devices. Application workflows may translate business intents into stateless intents. Controller devices support user intents, such that an administrator can describe the intended state of the network.

In customer deployments, there may be thousands to millions of intents. When the intents are changed, the controller device typically deploys data in the network via transactions. In some cases, there may be concurrent changes across the devices, as multiple administrators may modify the intents in parallel. Changes to the intent model may include extending the unified graph model, allowing for extensibility of the intent model.

Techniques described herein may help to improve a performance of a network. For example, a controller device may be configured to determine, using an abstract function configured at a node of a plurality of nodes, a stateless intent for implementing a stateful intent. In this example, the controller device may generate low level configuration data for the plurality of network devices based on the stateless intent and interface, with one or more of the plurality of network devices to configure the one or more of the plurality of network devices with the low level configuration data. Determining a stateless intent for implementing a stateful intent for configuring network devices may effectively configure the network devices of the network faster than systems that do not determine a stateless intent for implementing a stateful intent.

In one example, a method includes: receiving, by a controller device that manages a plurality of network devices and for a data structure, an indication of a stateful intent, the data structure including a plurality of nodes and a plurality of edges, each node of the plurality of nodes being representative of a respective network device of the plurality of network devices and the plurality of edges defining relationships between the plurality of nodes; determining, by the controller device, using an abstract function configured at a node of the plurality of nodes, a stateless intent for implementing the stateful intent; generating, by the controller device, low level configuration data for the plurality of network devices based on the stateless intent; and interfacing, by the controller device, with one or more of the plurality of network devices to configure the one or more of the plurality of network devices with the low level configuration data.

In another example, a controller device that manages a plurality of network devices includes one or more processing units implemented in circuitry and configured to: receive, for a data structure, an indication of a stateful intent, the data structure including a plurality of nodes and a plurality of edges, each node of the plurality of nodes being representative of a respective network device of the plurality of network devices and the plurality of edges defining relationships between the plurality of nodes; determine, using an abstract function configured at a node of the plurality of nodes, a stateless intent for implementing the stateful intent; generate low level configuration data for the plurality of network devices based on the stateless intent; and interface with one or more of the plurality of network devices to configure the one or more of the plurality of network devices with the low level configuration data.

In one example, a computer-readable storage medium has stored thereon instructions that, when executed, cause a processor of a controller device that manages a plurality of network devices to: receive, for a data structure, an indication of a stateful intent, the data structure including a plurality of nodes and a plurality of edges, each node of the plurality of nodes being representative of a respective network device of the plurality of network devices and the plurality of edges defining relationships between the plurality of nodes; determine, using an abstract function configured at a node of the plurality of nodes, a stateless intent for implementing the stateful intent; generate low level configuration data for the plurality of network devices based on the stateless intent; and interface with one or more of the plurality of network devices to configure the one or more of the plurality of network devices with the low level configuration data.

In another example, a controller device that manages a plurality of network devices includes: means for receiving an indication of a stateful intent, the data structure including a plurality of nodes and a plurality of edges, each node of the plurality of nodes being representative of a respective network device of the plurality of network devices and the plurality of edges defining relationships between the plurality of nodes; means for determining, using an abstract function configured at a node of the plurality of nodes, a stateless intent for implementing the stateful intent; means for generating low level configuration data for the plurality of network devices based on the stateless intent; and means for interfacing with one or more of the plurality of network devices to configure the one or more of the plurality of network devices with the low level configuration data.

The details of one or more examples are set forth in the accompanying drawings and the description below. Other features, objects, and advantages will be apparent from the description and drawings, and from the claims.

DETAILED DESCRIPTION

Techniques described herein may be used in self-driving controllers to support business policies. Some solutions may not provide extensibility of business policies, such as, business intents, and/or may not support end-to-end business policies. Such systems may not support generic modeling to support the business policies that support assurance for the business policies. User intents may include business intents (e.g., stateful intents) that can be resolved into stateless intents based on a current state of a network. Examples of business intents may include, but are not limited to, a bandwidth between devices. Examples of stateless intents may include, but are not limited to, a virtual private network (VPN) connection, a label-switched path (LSP) tunnel, or an optical connection. Stateless intents may include a fully declarative description of the intended network, compute, and/or storage state without a current state of the network. Techniques described herein provide an approach to translate from business intents to stateless intents to configure a network.

Rather than configuring network devices with low level configuration data based only on stateless intents (e.g., a VPN connection, an LSP tunnel, etc.), techniques described herein may configure a controller device to determine a stateless intent using a stateful intent (e.g., a desired bandwidth between devices). For example, the controller device may determine a stateless intent for implementing the stateful intent using an abstract function. In this way, the controller device may be extended to support stateful intents, such as business policies. Extending a controller device to support stateful intents may effectively configure the network devices of the network faster than systems that do not determine a stateless intent for implementing a stateful intent.

Figure 1:
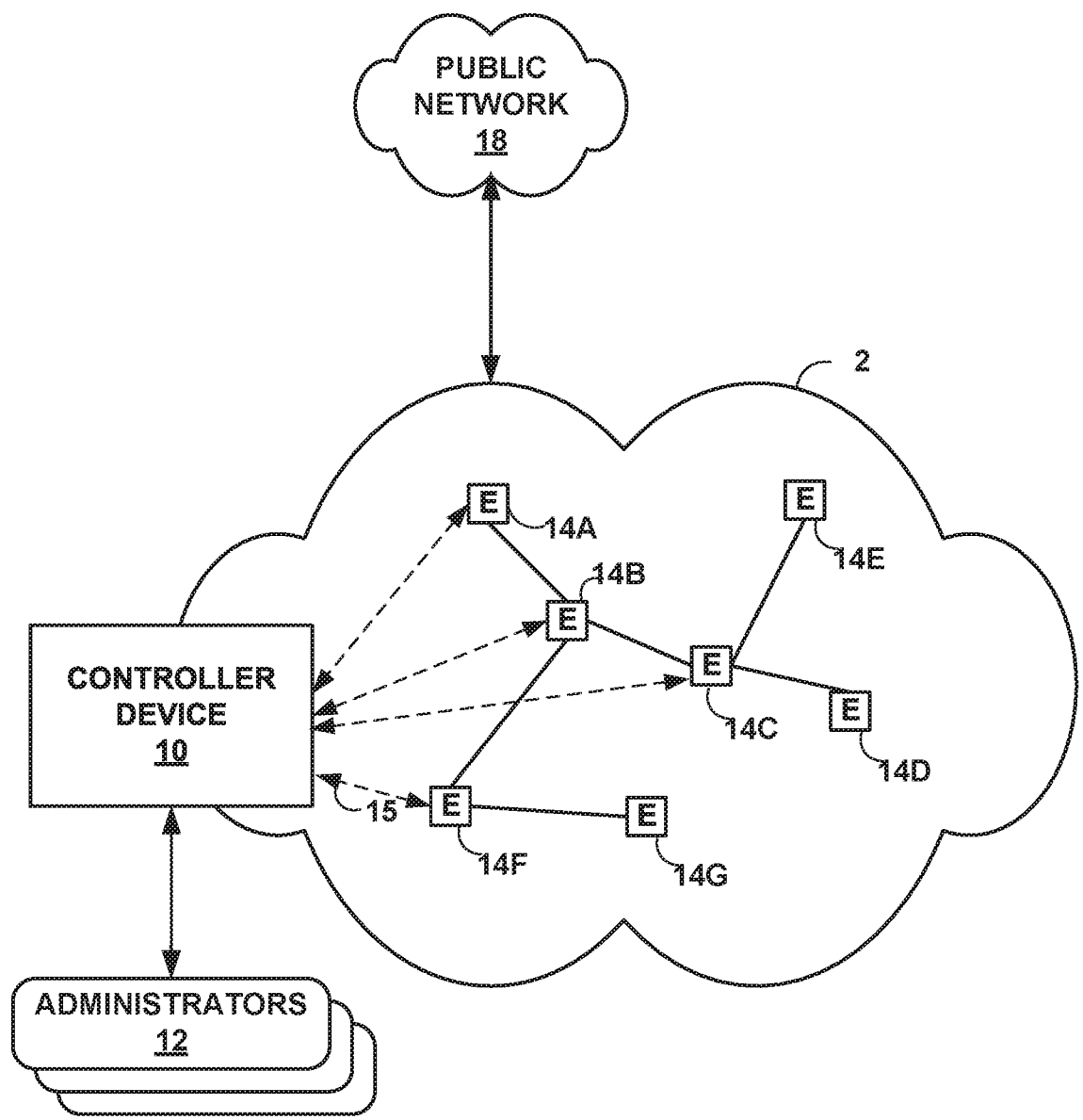
FIG. 1 is a block diagram illustrating an example including elements of an enterprise network that are managed using a management device.

FIG. 1 is a block diagram illustrating an example including elements of an enterprise network 2 that are managed using a controller device 10. Managed elements 14A-14G (collectively, "elements 14") of an enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting logical packets, enterprise network 2 may transmit data according to any other discrete data unit defined by any other protocol, such as a cell defined by the asynchronous transfer mode (ATM) protocol, or a datagram defined by the user datagram protocol (UDP). Communication links interconnecting elements 14 may be physical links (e.g., optical, copper, and the like), wireless, or any combination thereof.

Enterprise network 2 is shown coupled to a public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 may be communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrators 12 may use controller device 10 (or multiple such management devices) to manage the network devices using a device management protocol. One example device protocol is the simple network management protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

Controller device 10, also referred to as a network management system (NMS) or NMS device, and elements 14 may be centrally maintained by an information technology (IT) group of the enterprise. Administrators 12 may interact with controller device 10 to remotely monitor and configure elements 14. For example, administrators 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including local area networks (LANs), virtual LANs (VLANs), VPNs, and other network types.

In some examples, administrators 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrators 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrators 12 may use controller device 10 to configure elements 14 to specify certain operational characteristics that further the objectives of administrators 12. For example, administrators 12 may specify for an element 14 a particular operational policy regarding security, device accessibility, traffic engineering, quality of service (QoS), network address translation (NAT), logical packet filtering, logical packet forwarding, rate limiting, or other policies. Controller device 10 uses one or more network management protocols designed for management of configuration data within managed network elements 14, such as the SNMP protocol or the network configuration protocol (NETCONF) protocol or a derivative thereof, such as the Juniper™ Device Management Interface, to perform the configuration. In general, NETCONF provides mechanisms for configuring network devices and uses an extensible markup language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Controller device 10 may establish NETCONF sessions with one or more of elements 14.

Controller device 10 may be configured to compare a new intent model to an existing (or old) intent model, determine differences between the new and existing intent models, and apply the translation functions to the differences between the new and old intent models. In particular, controller device 10 determines whether the new set of configuration data includes any additional configuration parameters relative to the old intent model, as well as whether the new set of configuration data modifies or omits any configuration parameters that were included in the old intent model.

The intent model may be expressed in Yang, which is described in Bjorklund, "Yang—A Data Modeling Language for the Network Configuration Protocol (NETCONF)," Internet Engineering Task Force, RFC 6020, October 2010, available at tools.ietf.org/html/rfc6020. In some examples, the intent model may be expressed in JavaScript Object Notation (JSON). Controller device 10 may include various translation functions for translating the intent model differences. These functions are configured accept the intent model (which may be expressed as structured input parameters, e.g., according to Yang or JSON).

Controller device 10 may use Yang modeling for intent. This data may contain relations across Yang entities, such as list items and containers. Conventionally, controller devices may not support configuration management functions in real time. As discussed in greater detail below, controller device 10 may convert a Yang data model into a database model and convert Yang validations into data validations. Techniques for managing network devices using a graph model for high level configuration data is described in "CONFIGURING AND MANAGING NETWORK DEVICES USING PROGRAM OVERLAY ON YANG-BASED GRAPH DATA- BASE," U.S. patent application Ser. No. 15/462,465, filed Mar. 17, 2017, the entire contents of which are hereby incorporated by reference.

The low-level configuration data may conform to a command language supported by each of elements 14. For instance, low-level configuration data for element 14A may be in a first vender-specific language supported by element 14A, low-level configuration data for element 14B may be in a second vender-specific language supported by element 14B and not supported by element 14A, and so on. Controller device 10 may include various reactive mappers for translating the intent data model differences. These functions are configured accept the intent data model (which may be expressed as structured input parameters, e.g., according to YANG or YAML). The functions are also configured to output respective sets of low-level device configuration data changes, e.g., device configuration additions and removals.

Controller device 10 may represent an autonomic system that manages itself without human intervention. In some examples, controller device 10 may be configured to perform one or more of self-configuring, self-healing, self-optimizing, or self-protecting. Techniques described herein may take business intents as an input and controller device 10 may be configured to select resources, generate stateless intents corresponding to the business intents, and configure network 2.

In accordance with the techniques of the disclosure, controller device 10 may be configured to translate business intents to stateless intents to configure network 2. For example, rather than configuring elements 14 with low level configuration data based only on stateless intents (e.g., a VPN connection, an LSP tunnel, etc.), techniques described herein may configure controller device 10 to determine a stateless intent using a stateful intent (e.g., a desired bandwidth between devices). For example, controller device 10 may determine a data structure including a plurality of nodes and a plurality of edges, each node of the plurality of nodes being representative of a respective network device of elements 14 and the plurality of edges defining relationships between the plurality of nodes. In this example, controller device 10 may determine a stateless intent for implementing the stateful intent using an abstract function configured at a node of the plurality of nodes. In this way, controller device 10 may be extended to support stateful intents, such as business policies. Extending controller device 10 to support stateful intents may effectively configure elements 14 of network 2 faster than systems that do not determine a stateless intent for implementing a stateful intent.

For example, controller device 10 may represent a controller device configured to perform the method of receiving, for a data structure, an indication of a stateful intent, the data structure including a plurality of nodes and a plurality of edges, each node of the plurality of nodes being representative of a respective network device of the plurality of network devices and the plurality of edges defining relationships between the plurality of nodes, determining, using an abstract function configured at a node of the plurality of nodes, a stateless intent for implementing the stateful intent, generating low level configuration data for the plurality of network devices based on the stateless intent, and interfacing, by the controller device, with one or more of the plurality of network devices to configure the one or more of the plurality of network devices with the low level configuration data.

In some examples, controller device 10 may represent a controller device configured to perform a method for providing business intent assurance for a self-driving network, the method comprising: generating, a logical packet based on a stateless intent for implementing the stateful intent, injecting the logical packet into a data structure, the data structure including a plurality of nodes and a plurality of edges, each node of the plurality of nodes being representative of a respective network device of the plurality of network devices and the plurality of edges defining relationships between the plurality of nodes, traversing the logical packet from a source node of the plurality of nodes that is indicated by the stateless intent towards a destination node of the plurality of nodes that is indicated by the stateless intent to generate first low level configuration data for the plurality of network devices, interfacing, with one or more of the plurality of network devices to configure the one or more of the plurality of network devices with the low level configuration data, collecting aggregated metric information for the plurality of network devices after configuring the one or more of the plurality of network devices with the first low level configuration data, determining the stateless intent is not satisfied based on the aggregated metric information, in response to determining the stateless intent is not satisfied, traversing the logical packet from the source node towards the destination node to generate second low level configuration data for the plurality of network devices, and configuring one or more of the plurality of network devices with the second low level configuration data.

In some examples, controller device 10 may represent a controller device configured to perform a method for stateful intent conflict detection comprising: receiving, for a data structure, an indication of a first stateful intent and a second stateful intent, the data structure including a plurality of nodes and a plurality of edges, each node of the plurality of nodes being representative of a respective network device of the plurality of network devices and the plurality of edges defining relationships between the plurality of nodes, determining, using an abstract function at a node of the data structure, the first stateless intent is in conflict with the second stateless intent, resolving the second stateless intent into a third stateless intent using the abstract function, generating low level configuration data for the plurality of network devices based on the first stateless intent and the third stateless intent, and interfacing, with one or more of the plurality of network devices to configure the one or more of the plurality of network devices with the low level configuration data.

In some examples, controller device 10 may represent a controller device configured to perform a method for generating stateless intents, the method comprising: receiving a condition for a policy to operate the plurality of network devices, generating, based on the condition, a stateful intent for a data structure, the data structure including a plurality of nodes and a plurality of edges, each node of the plurality of nodes being representative of a respective network device of the plurality of network devices and the plurality of edges defining relationships between the plurality of nodes, determining, using an abstract function configured at a node of the plurality of nodes, a stateless intent for implementing the stateful intent, and interfacing, with one or more of the plurality of network devices to configure the one or more of the plurality of network devices using the stateful intent.

Figure 2:
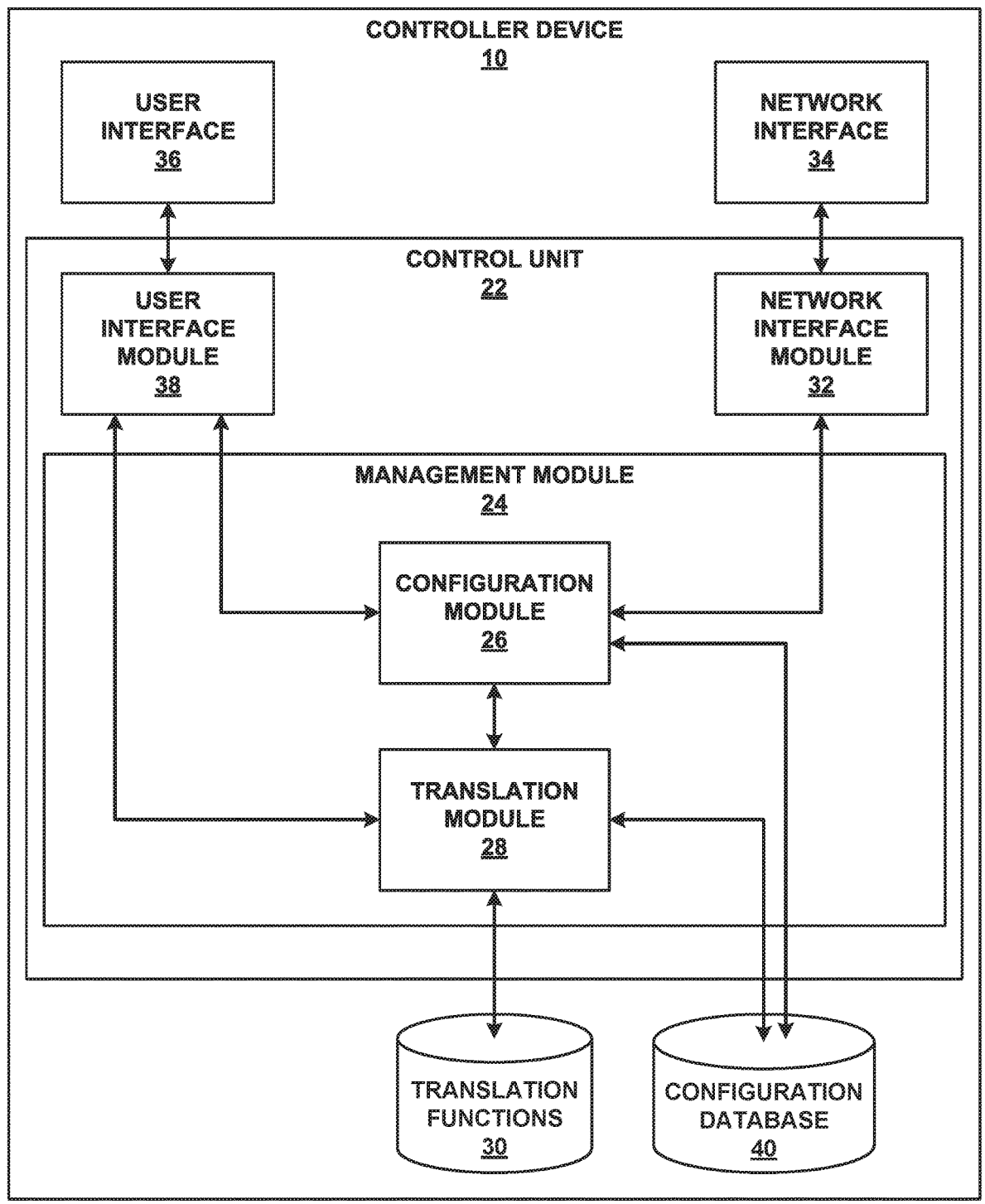
FIG. 2 is a block diagram illustrating an example set of components for the management device of FIG. 1.

FIG. 2 is a block diagram illustrating an example set of components for controller device 10 of FIG. 1. In this example, controller device 10 includes a control unit 22, a network interface 34, and a user interface 36. Network interface 34 represents an example interface that can communicatively couple network device 20 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, it should be understood that administrators 12 need not directly interact with controller device 10, but instead may access controller device 10 remotely, e.g., via network interface 34.

In this example, control unit 22 includes user interface module 38, network interface module 32, and management module 24. Control unit 22 may execute user interface module 38 to receive input from and/or provide output to user interface 36. Control unit 22 may execute network interface module 32 to send and receive data (e.g., logical packets) via network interface 34. User interface module 38, network interface module 32, and management module 24 may be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, DSPs, ASICs, FPGAs, or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 may execute management module 24 to manage various network devices, e.g., elements 14 of FIG. 1. Management includes, for example, configuring the network devices according to instructions received from a user (e.g., administrators 12 of FIG. 1) and providing the user with the ability to submit instructions to configure the network devices. In this example, management module 24 may include configuration module 26 and translation module 28.

Management module 24 is configured to receive intent unified-graph-modeled configuration data for a set of managed network devices from a user, such as administrators 12. The intent unified-graph-modeled configuration data may be referred to as an "intent model." Over time, the user (e.g., administrators 12 of FIG. 1) may update the configuration data, e.g., to add new services, remove existing services, or modify existing services performed by the managed devices. The intent model configuration data may be structured according to, e.g., Yang or JSON. The graph model may include a plurality of vertices connected by edges in a hierarchical fashion. In Yang, edges of graph models are represented though "leafref" elements. In the case of JSON, such edges may be represented with a "ref" edge. Similarly, parent to child vertex relations can be represented with a "has" edge. For example, a vertex for Element A refers to a vertex for Element B using a has-edge can be understood to mean, "Element A has Element B." In some examples, management module 24 may provide the user with the ability to submit translation functions that translation module 28 executes to transform intent model configuration instructions to device-specific, configuration instructions.

Controller device 10 may include configuration database 40. Configuration database 40 generally includes information describing managed network devices, e.g., elements 14. For example, configuration database 40 may include information indicating device identifiers (such as a media access control (MAC) address and/or an internet protocol (IP) address), device type, device vendor, devices species (e.g., router, switch, bridge, hub, etc.), and/or other information. Configuration database 40 also stores current configuration information (e.g., intent model configuration information, or in some cases, both intent model configuration) for the managed devices (e.g., elements 14).

Configuration module 26 may determine an existing set of intent model configuration information for each service performed by the devices for which configuration is to be updated, e.g., by retrieving the existing set of intent model configuration information for each of the services from configuration database 40. Configuration module 26 may compare the existing set of intent model configuration information to the newly received set of intent model configuration information, and determine differences between the existing and newly received sets of intent model configuration information. Configuration module 26 may pass the differences between the existing and newly received sets of intent model configuration information to translation module 28, for translation into respective sets of configuration information. Configuration module 26 may update the existing intent model configuration information recorded in configuration database 40 based on the newly received set of intent model configuration information.

Translation module 28 may determine which of translation functions 30 to execute on the intent model configuration instructions based on the information of configuration database 40. Translation module 28 may execute each of the determined translation functions of translation functions 30, providing the intent model configuration instructions to the translation functions as input and receiving low level configuration instructions. For example, translation module 28 may be configured to generate low level configuration data for network 2 based on stateless intent. In this example, translation module 28 may be configured to interface, with one or more of network elements 14 to configure the one or more of the network elements 14 with the low level configuration data.

Some applications may model an intent model as a unified graph model. For instance, in some applications, management module 24 may represent the intent data model as connected, such that business policies can be implemented across intent models. For example, management module 24 may use a data model that is a unified graph, where vertices are connected as with has-edge and ref-edge. In some examples, management module 24 may use an application that includes an intent model as a topology graph.

Translation module 28 may be configured to realize business policies to network 2 and provide assurance of the policies. For example, translation module 28 may be configured to determine stateless intents to realize the business policy. Translation module 28 may be configured to select resources for stateless intents. In some instances, translation module 28 may be configured to perform business policy translation based on a network state (e.g., based on endpoints roles, services to be provisioned, etc.). Translation module 28 may configured to perform business intent translation based on current policies running in network 2.

Translation module 28 may represent an autonomic system configured to perform one or more of self-configuring, self-healing, self-optimizing, or self-protecting. Techniques described herein may take business intents as an input and controller device 10 may be configured to select resources, generate stateless intents corresponding to the business intents, and configure network 2.

Techniques described herein represent a complete network represented by a data structure, such as, for example, but not limited to, a unified graph model that includes stateless intents. Such techniques may represent data structure (e.g., the connected unified graph) as a state machine, where the "logical packet" determines the state. As used herein, a logical packet may be configured to traverse nodes of a data structure via one or more edges. The transitions in the model are determined by the logical packet includes location (e.g., vertex id) and "policy functions" in the data structure (e.g., unified graph). Techniques described herein may use policies or business intents as abstract functions that would be attached to vertices of the unified graph. Techniques described herein may construct a logical packet from business intents and transmit the logical packet through abstract functions in the unified graph. The abstract functions may either forward the logical packet to one or more new located logical packets or filter the logical packet. The abstract functions may, for example, be programmed by a human user. Techniques described herein modify the logical packet. As part of modifying the logical packet, techniques described herein may select the resources. This may allow extensibility as, select the resources may allow a controller device to write policies independently.

In accordance with the techniques of the disclosure, translation module 28 may be configured to translate business intents to stateless intents to configure network 2. For example, rather than configuring elements 14 with low level configuration data based only on stateless intents (e.g., a VPN connection, an LSP tunnel, etc.), techniques described herein may configure translation module 28 to determine a stateless intent using a stateful intent (e.g., a desired bandwidth between devices). For example, translation module 28 may determine a data structure including a plurality of nodes and a plurality of edges, each node of the plurality of nodes being representative of a respective network device of elements 14 and the plurality of edges defining relationships between the plurality of nodes. In this example, translation module 28 may determine a stateless intent for implementing the stateful intent using an abstract function configured at a node of the plurality of nodes. In this way, translation module 28 may be extended to support stateful intents, such as business policies. Extending translation module 28 to support stateful intents may effectively configure elements 14 of network 2 faster than systems that do not determine a stateless intent for implementing a stateful intent.

For example, controller device 10 may represent a controller device configured to perform the method of receiving, for a data structure, an indication of a stateful intent, the data structure including a plurality of nodes and a plurality of edges, each node of the plurality of nodes being representative of a respective network device of the plurality of network devices and the plurality of edges defining relationships between the plurality of nodes, determining, using an abstract function configured at a node of the plurality of nodes, a stateless intent for implementing the stateful intent, generating low level configuration data for the plurality of network devices based on the stateless intent, and interfacing, by the controller device, with one or more of the plurality of network devices to configure the one or more of the plurality of network devices with the low level configuration data.

Figure 3:
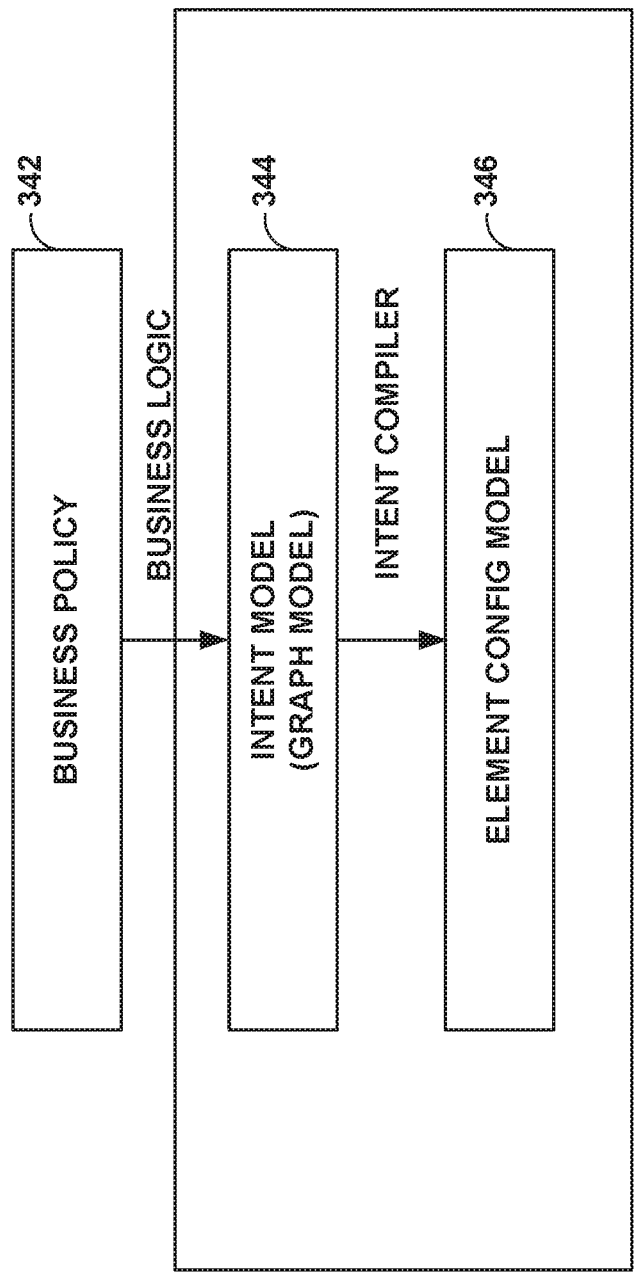
FIG. 3 is a block diagram illustrating an example workflow to translate business policies into stateless intents.

FIG. 3 is a block diagram illustrating an example workflow to translate business policies into stateless intents. In the example of FIG. 3, translation module 28 may be configured to receive a business policy (e.g., a business or stateful intent) (342). Translation module 28 may be configured to translate the business policies to stateless intents (344) and resources for an element configuration model (346). For example, translation module 28 may use one or more abstract functions programmed by a human user to translate the business policies to stateless intents, which may be used to translate the resources for an element configuration model.

The example workflow of FIG. 3 may help to determine the stateless intents to realize the business policy. Techniques described herein for determining the stateless intents described herein may include determining a stateless intent based on a current state of network 2 and policies of network 2. Techniques described herein for determining the stateless intents described herein may include selecting resources for stateless intents. Techniques described herein for determining the stateless intents described herein may support an extension of new business polity models.

Controller device 10 may have multiple (e.g., 2, 3, 4, or more than 4) applications. For example, controller device 10 may be configured as a connectivity services controller (e.g., services provider connectivity services—VPNs). Controller device 10 may be configured as a wide area network (WAN) controller (e.g., provision LSPs). Controller device 10 may be configured as a software-drive WAN (SD-WAN) controller (e.g., core to customer network). Controller device 10 may be configured to manage security.

For example, after a customer (e.g., an administrator of administrators 12 of FIG. 1) installs a connectivity service controller, when a WAN controller is installed, techniques described herein may extend the business intent model with WAN stateless intents. Moreover, techniques described herein may extend the business intent model with manage security stateless intents. Such techniques may augment business intent translation logic. However, some systems do not provide extensibility of the business policies, do not support end-to-end business policies, and do not support generic modeling to support business policies that supports assurance for business policies.

Figure 4:
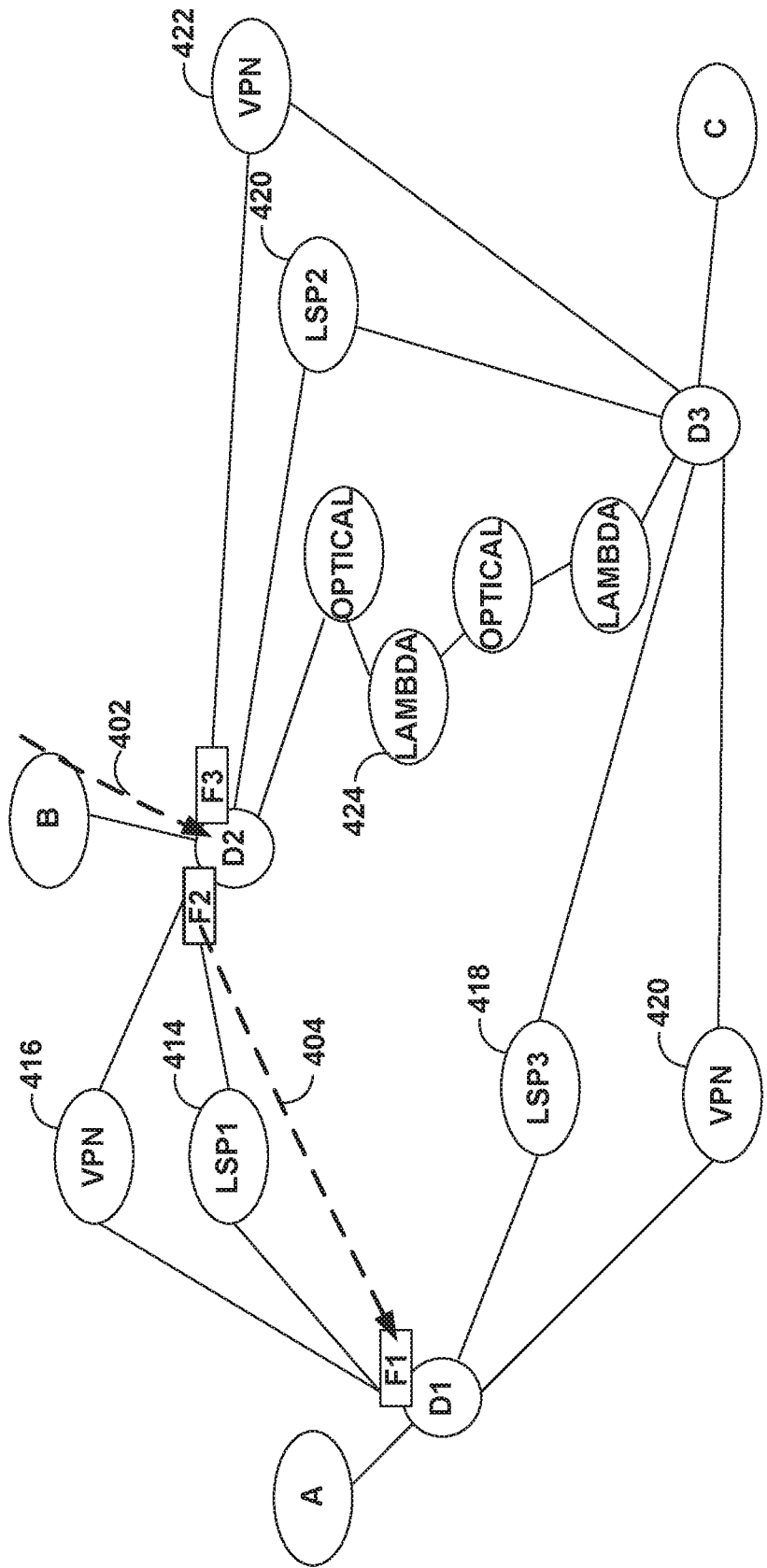
FIG. 4 is a block diagram illustrating an example unified graph model.

FIG. 4 is a block diagram illustrating an example unified graph model 400. The example of FIG. 4 may represent a data structure including a plurality of nodes and a plurality of edges, each node of the plurality of nodes being representative of a respective network device of the plurality of network devices and the plurality of edges defining relationships between the plurality of nodes. FIG. 4 illustrates an example stateless intent unified graph that includes a VPN intent, a LSP intent, and a Lambda intent. As used herein, Lambda may refer to a photonic switching or wavelength switching. For example, Lambda intent may refer to increasing or decreasing a bandwidth in an optical device. In this example, overall business intents may influence the intent logical packet forwarding (e.g., connectivity), filtering, and modifications. As part of business intent realization, translation module 28 may be configured to create and/or update stateless intents and/or resources for stateless intents.

In the example of FIG. 4, the business intent of FIG. 4 is to provide 30 Megabits per second (Mbps) of VPN connectivity between site B (e.g., a source node) and site C (e.g., a destination node). Translation module 28 may be configured to receive a stateful intent for a Layer 3 (L3) VPN ("L3vpn") and a transport mechanism between site B and site C that provides the 30 Mbps of bandwidth. For example, translation module 28 may traverse a logical packet 402 from site B to site C to provide the business intent of providing 30 Mbps of VPN connectivity between site B and site C. As shown, when logical packet 402 reaches device D2, translation module 28 may apply instructions of abstract function F2 that generate RSVP LSP 414 and VPN 416 between site B and site A and generate a dependent logical packet 404 that traverses RSVP LSP 414 and VPN 416 to device D1, in response to logical packet 402. When logical packet 404 reaches device D1, translation module 28 may apply instructions of abstract function F1 that generate RSVP LSP 418 and VPN 420 between site A and site C, in response to logical packet 404.

Additionally, when logical packet 402 reaches device D2, translation module 28 may apply instructions of abstract function F3 that generate RSVP LSP 420 and VPN 422 between site B and site C. To generate the stateless optical intent, translation module 28 may be configured to provision a new 10G lambda 424 between cite B and cite C on the optical network. In this way, translation module 28 may be configured to provide 30 Mbps of VPN connectivity between site B and site C without user interaction. While realizing the stateful intents, translation module 28 may be configured to determine existing stateless intents across endpoints and the state.

Example properties of logical packet 402 are included in the following table.

TABLE 1 example properties

| Field | Description |
|---|---|
| Action | Action of the logical packet. Based on business intent, action may be created. Allowed values are: Connect Allow Block . . . |
| Source | Source point in the unified intent model. It also can contain the selection criteria to pick up the source resource. |
| Destination | Destination point in the unified intent model. It also can contain the selection criteria to pick up the destination resource. |
| QOS | Quality of the service field. This field would be populated based on Action. Applicable in case of "Connectivity" action. |

TABLE 1-continued example properties

| Field | Description |
|---|---|
| Properties | Json with key, value pairs. Populated by the policy functions attached to the vertices in Unified Intent model. |

A logical packet may be extended based on new policies supported. The properties field may include a key and a value pair that can have additional fields based on new policies.

Translation module 28 may be configured to use resource roles through labels. For example, translation module 28 may use a unified graph model that includes a stateless intent applied on network elements such as devices, interfaces, and other network elements. In some examples, the unified graph model may include a role for every network element. For instance, the unified graph model may include roles such as, but not limited to, a core device, an edge device, a hub device, and other roles.

Translation module 28 may be configured for action to intent mapping. For example, translation module 28 may be configured to use overall business intents to influence intent logical packet forwarding (e.g., connectivity), filtering, modifications. In some examples, action to intent mapping may be signified with an action field in a simulated logical packet. The action to intent mapping may be maintained in translation module 28 for a given action and/or intent based on a role. For example, to support connectivity, translation module 28 may be configured to use action to intent mapping with Layer-2 VPN services (l2vpn) and/or Ethernet VPN (EVPN). In this example, translation module 28 may use action to intent mapping EVPN for core devices as illustrated in the following table, which may be customized based on a customer environment.

TABLE 2

Example Action to Intent Mapping

| Action | Role | Intent |
|---|---|---|
| Connectivity | Datacenter edge | EVPN |
| | Edge | L3VPN |
| | L2 Network | VLAN |
| Allow | Edge | Firewall |
| Modify | Edge | NAT |

For example, in response receiving a connectivity action of logical packet 402 and a label for device D2 indicating that device D2 is a datacenter edge, translation module 28 may be configured to apply Table 2 to map an intent of connectivity action to an EVPN.

Figure 5:
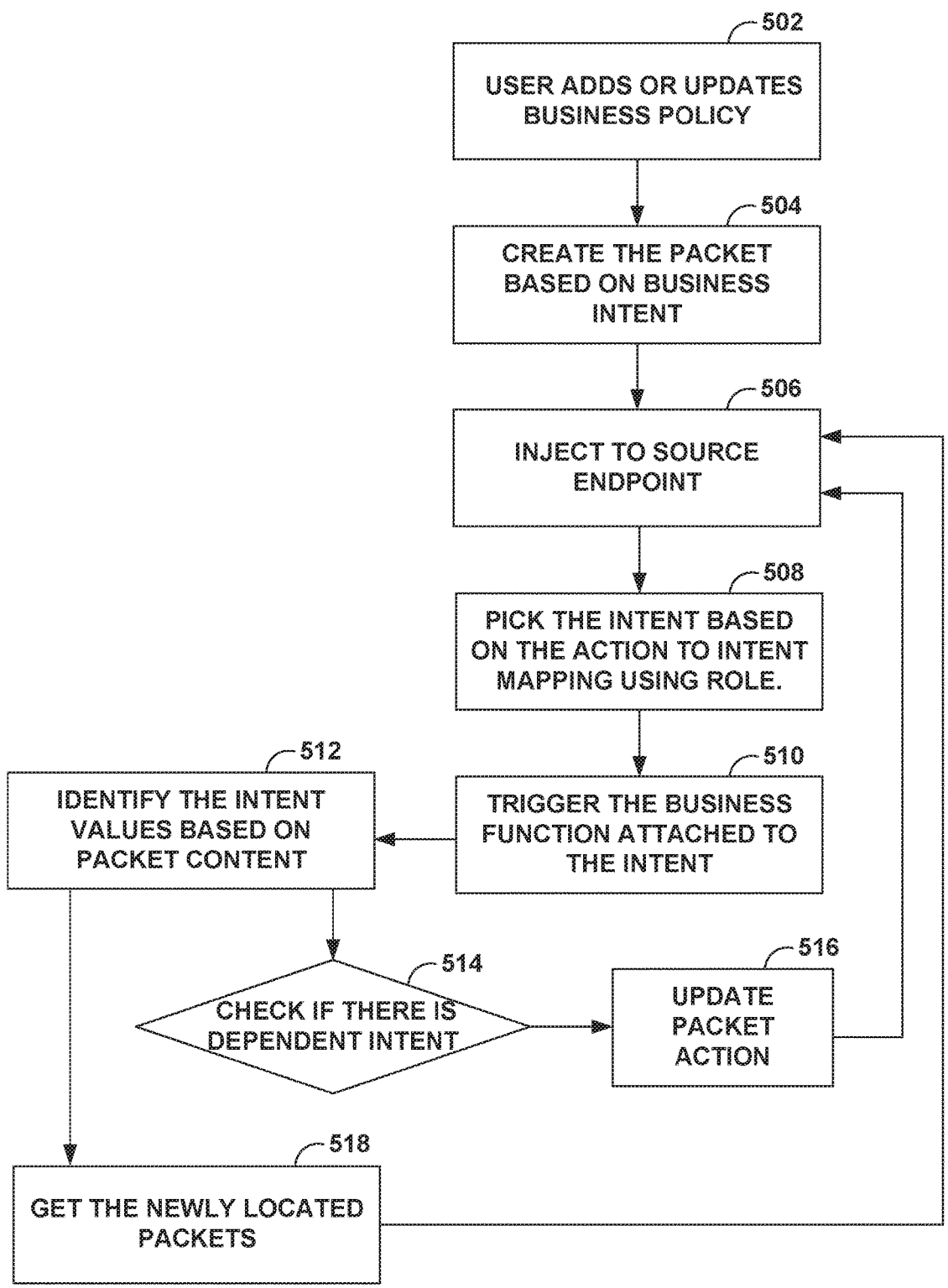
FIG. 5 is a block diagram illustrating an example process for business intent translation.

FIG. 5 is a block diagram illustrating an example process for business intent translation. In the example of FIG. 5, a user may add or update a business policy (502). For example, a user (e.g., an administrator of administrators 12 of FIG. 1) may provide an input indicating a business intent of providing 30 Mbps of VPN connectivity between site B and site C of FIG. 4. When the business intent is received by translation module 28, translation module 28 may be configured to create a logical packet based on the business intent (504) and inject the logical packet to the source node of the connected graph (506). For example, translation module 28 may generate logical packet 402 and inject the logical packet to device D2. There may be labels for the network elements.

For example, device D2 may have a label of "datacenter edge." Based on an action of the logical packet, translation module 28 may be configured to pick the corresponding policy using a role (508). For example, translation module 28 may be configured to select EVPN using Table 2 in response to determining D2 has a label of "datacenter edge" and logical packet 402 indicating an action of "connectivity." There may be many ways to achieve business intent. To support connectivity, translation module 28 may be configured to use l2vpn/EVPN. But for core devices, translation module 28 may be configured to use EVPN.

Once the policy is picked, translation module 28 may be configured to trigger the business function attached to the intent (510). For example, translation module 28 may be configured to pass the logical packet through the EVPN abstract function F2 and/or F3. Translation module 28 may be configured to identify intent values based on the logical packet content (512). For example, translation module may perform a function that checks the bandwidth parameter and identifies the EVPN policy object to achieve the business intent.

Translation module 28 may be configured to get (e.g., receive, determine, etc.) newly located logical packets (518) and output the logical packet that would be located to the next endpoint. Translation module 28 may be configured to check if there is any dependent intent (514) and update the logical packet action (546) and inject. For example, translation module 28 may be configured to generate logical packet 404 and output logical packet 404 to device D1 according to instructions of EVPN abstract function F2 and logical packet 402. After steps 516 and 518, the process of FIG. 5 will proceed to step 506. For instance, translation module 28 may be configured to determine a dependent packet using the abstract function and the packet and inject the dependent packet towards a next node of a data structure.

The following changes may support new use cases. In some examples, translation module 28 may be configured to use stateless intent models. Translation module 28 may be configured to use business policy functions. Translation module 28 may be configured to extend a logical packet with actions. In this way, translation module 28 may be configured to support business intents without modifying the existing business intent translation logic.

Techniques described herein may provide one or more of the following. Translation module 28 may be configured to determine the stateless intents to realize the business policy. For example, translation module 28 may be configured to determine the stateless intents based on the current state of the network and policies in network 2. Translation module 28 may be configured to select the resources for the stateless intents. In some examples, translation module 28 may be configured to support extension of new business policy models.

The techniques described herein may be used in SDN controllers, orchestration systems, network management systems, or other systems. Such techniques may help to solve business policy support.

Figure 6:
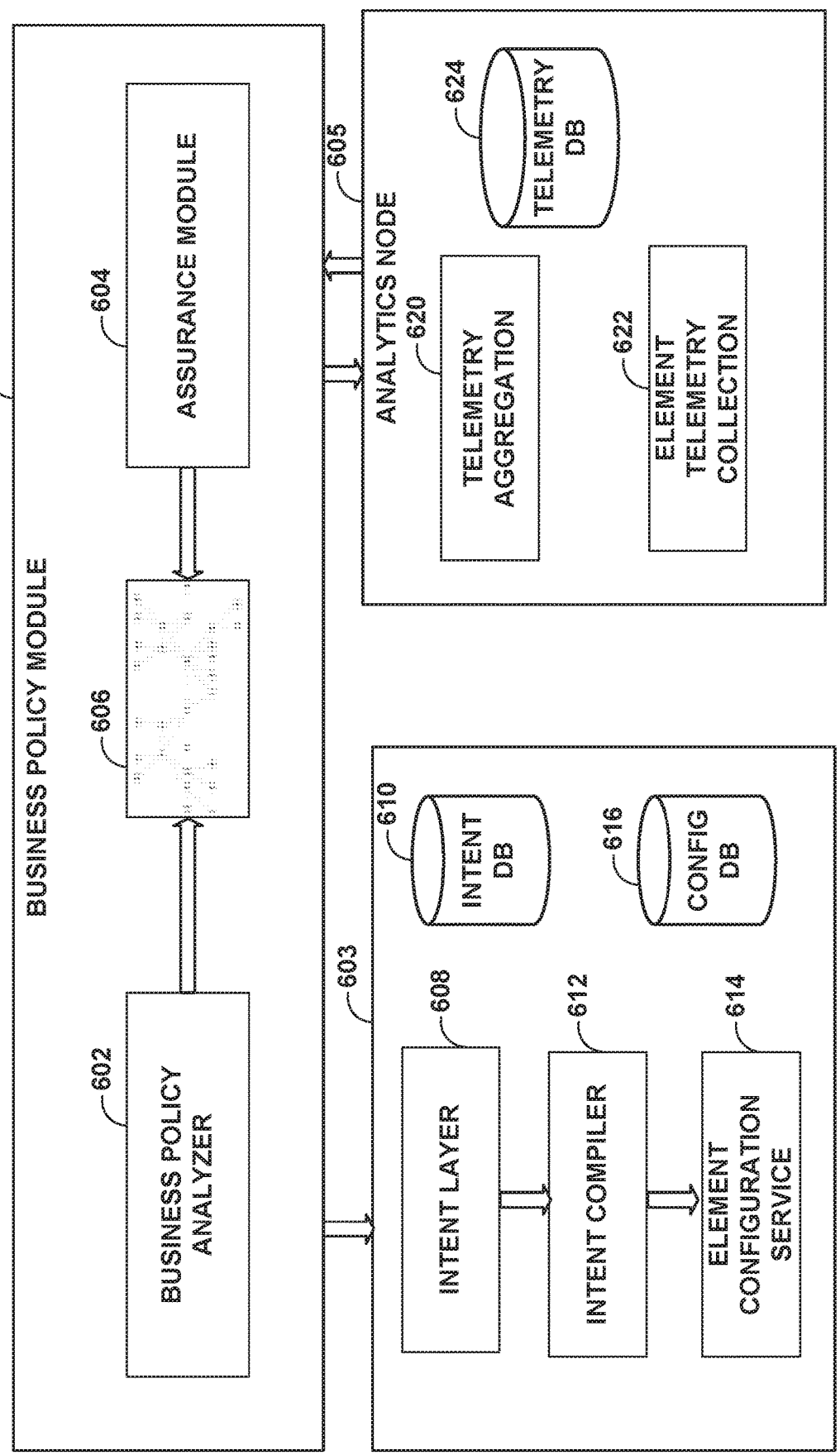
FIG. 6 is a block diagram illustrating an example business policy analyzer for business intent assurance that may be implemented by the translation module of FIG. 2.

FIG. 6 is a block diagram illustrating an example business policy analyzer for business intent assurance that may be implemented by translation module 28 of FIG. 2. Techniques described herein may be used in self-driving controllers to support business policies. Some solutions may not provide extensibility of the business policies. Some solutions do not support end-to-end business policies. Moreover, in some systems there is no generic modeling to support business policies that supports assurance for the business policies.

Based on business intent realization, translation module 28 may be configured to derive network modeling. Translation module 28 may be configured to register for resource monitoring for the selected resources from analytics module. In the example of FIG. 6, translation module 28 may include a business policy module 601, a stateless intent module 603, and an analytics node 605.

Business policy module 601 may be configured to generate unified graph 606 and to inject logical packets into unified graph 606 for business intent assurance. As shown, business policy module 601 may include business policy analyzer 602 and assurance module 604. Business policy analyzer 602 may be configured to inject logical packets into unified graph 606 to generate a stateless intent from a business intent. Assurance module 604 may be configured to inject logical packets into unified graph 606 to recreate a logical packet to ensure that the business intent is satisfied even in cases of cascaded intents or a degradation of network 2.

Stateless intent module 603 may be configured to translate one or more stateless intents into element configuration information. Intent layer 608 may be configured to receive stateless intents from business policy analyzer 602. For example, business policy analyzer 602 may determine a business policy based on input by a human user, generate one or more stateless intents for the business policy, and output the one or more stateless intents to intent layer 608. Intent translator 612 may be configured to translate from one or more stateless intents into element configuration information. Element configuration service 614 may be configured to push the element configuration information to devices (e.g., elements of network 2) using intent database 610 and/or configuration database 616. Configuration database 616 may store element configuration element. For example, intent database 610 may include one or more preprogrammed abstraction functions (e.g., F1, F2, F3, etc.). In this example, intent translator 612 may generate the one or more stateless intents using the process described in FIG. 5.

Analytics node 605 generates analytical information for assurance module 604. As shown, analytics node 605 may include telemetry aggregation 620, element telemetry collection 622, and telemetry database 624. Telemetry aggregation 620 may aggregate analytic information stored in telemetry database 624 to determine whether a business intent is satisfied after applying configuration information to elements of network 2. For example, telemetry aggregation 620 may be configured to determine aggregated metric information. In this example, telemetry aggregation 620 may be configured to determine whether network 2 provides a bandwidth between site A and site B that is specified by a business policy. Telemetry collection 622 may be configured to generate telemetry information for individual elements (e.g., elements 14) of network 2.

In the example of FIG. 6, assurance module 604 may inject a logical packet previously injected by business policy analyzer 602 when analytics node 605 generates analytical information (e.g., aggregated metric information) indicating a resource degraded event has occurred. For example, while a business policy may specify a bandwidth of 30 Mbps between site A and site B, degradation at one or more of elements 14 may provide a bandwidth of only 15 Mbps. In this example, analytics node 605 would output an indication to assurance module 604 that a degradation event has occurred and assurance module 604 may inject a logical packet specifying a bandwidth of 30 Mbps between site A and site B.

Telemetry aggregation 620 may be configured to determine telemetry information at two or more of network elements 14, store the telemetry information at telemetry database 624, and generate the aggravated telemetry information using the telemetry information stored at telemetry database 624.

In this way, assurance module 604 would cause stateless intent module 603 to configure elements 14 to provide the bandwidth of 30 Mbps between site A and site B to provide business policy assurance. Techniques for business intent assurance may permit auto generation of assurance logic for business intents. Such techniques may provide an approach for the assurance for the multi layered intents. Translation module 28 may be configured to support extension for the new business policy models.

In some examples, translation module 28 of FIG. 6 may represent a controller device configured to perform a method for providing business intent assurance for a self-driving network, the method comprising: generating, a logical packet based on a stateless intent for implementing the stateful intent, injecting the logical packet into a data structure, the data structure including a plurality of nodes and a plurality of edges, each node of the plurality of nodes being representative of a respective network device of the plurality of network devices and the plurality of edges defining relationships between the plurality of nodes, traversing the logical packet from a source node of the plurality of nodes that is indicated by the stateless intent towards a destination node of the plurality of nodes that is indicated by the stateless intent to generate first low level configuration data for the plurality of network devices, interfacing, with one or more of the plurality of network devices to configure the one or more of the plurality of network devices with the low level configuration data, collecting aggregated metric information for the plurality of network devices after configuring the one or more of the plurality of network devices with the first low level configuration data, determining the stateless intent is not satisfied based on the aggregated metric information, in response to determining the stateless intent is not satisfied, traversing the logical packet from the source node towards the destination node to generate second low level configuration data for the plurality of network devices, and configuring one or more of the plurality of network devices with the second low level configuration data. While the example of FIG. 6 generates a unified graph, translation module 28 may be configured to generate other types of data structures.

Figure 7:
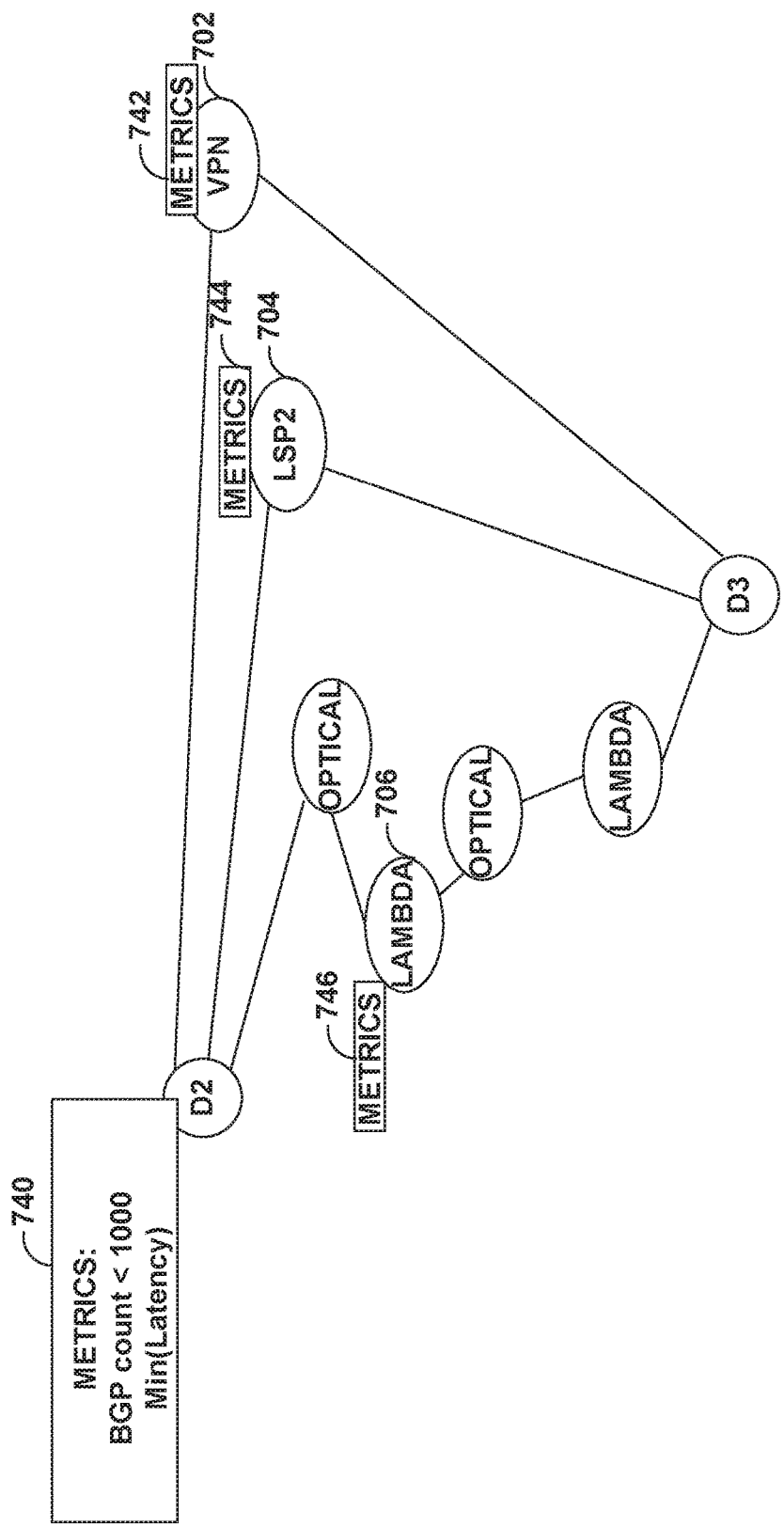
FIG. 7 is a block diagram illustrating an example graph model of cascaded intents.

FIG. 7 is a block diagram illustrating an example graph model of connectivity intents. In case of cascaded intents, translation module 28 may be configured to apply business intent assurance across layers. For connectivity intents, translation module 28 may be configured to apply business intent assurance as shown in FIG. 7. While the example of FIG. 7 shows a unified graph, translation module 28 may be configured to generate other types of data structures.

In the example of FIG. 7, element telemetry collection 622 generates metrics 742 for VPN 702, metrics 744 for LSP 2 704, and metrics 746 for Lambda 706 which are stored at telemetry database 624. Telemetry aggregation 620 generates aggregated metrics 740 using metrics 742, metrics 744, and metrics 746. As shown, aggregated metrics 740 indicates that Border Gateway Protocol (BGP) count is less than 1000 minimum latency. In this way, translation module 28 may be configured to derive the network modeling across layers. The various layer for the given example are: D2-VPN-D3, D2-LSP-D3, and D2-optical-Lamda-Optical2-lambda-D3. Any combination of metrics 740-746 may represent examples of aggregated metric information.

When the resource degraded event comes from analytics node 605, assurance module 604 may be configured to derive the impacted paths in unified graph 606. Assurance module 604 may be configured recreate the logical packet and select the resources and call various stateless intents.

Assurance module 604 may be configured to perform resource selection. Resource selection may be considered an optimization problem, where a business policy analyzer may select optimized resources based on logical packet query. For example, assurance module 604 may be configured to derive decision variables, objectives, constraints, or other information.

Assurance module 604 may be configured with an interface with analytics module 605. In this way, assurance module 604 may be configured to enable monitoring for properties on resources, listen for the metrics from analytics node 605, configure events on analytics node 605 for thresholds, and/or listen for the threshold crossing events and run stateless intent module 603.

Techniques described herein may allow for an approach to assurance for the business intents, auto generation of the assurance logic for business intents, provide an approach for the assurance for the multi layered intents. In some examples, translation module 28 may be configured to support extension for the new business policy models. Techniques described herein for business intent assurance may be used in SDN controllers, orchestration systems, network management systems, and/or other systems. In this way, techniques described herein for business intent assurance may help to provide business policy support.

Figure 8:
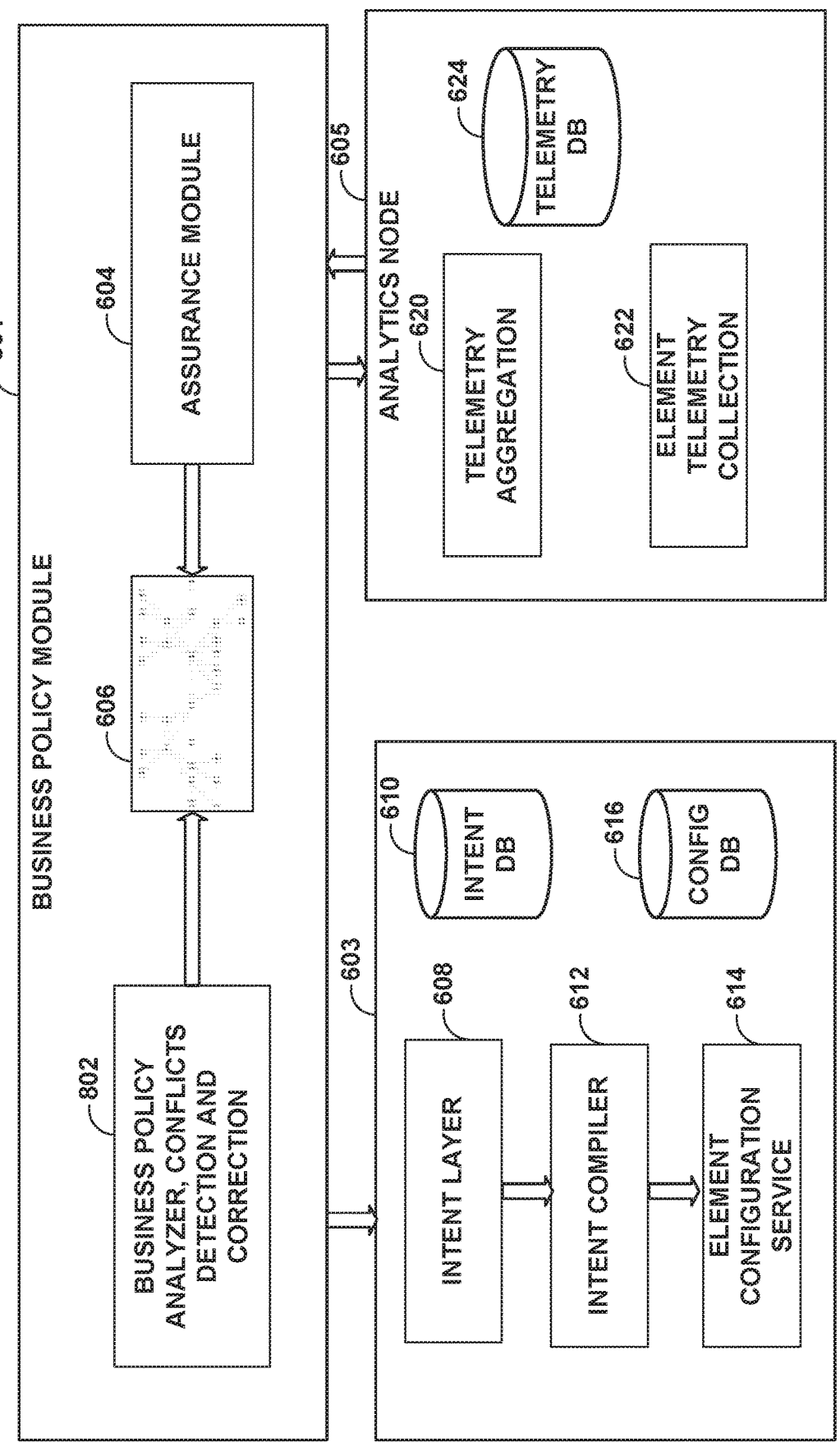
FIG. 8 is a block diagram illustrating an example business policy analyzer for business intent assurance and conflict detection and correction that may be implemented by the translation module of FIG. 2.

FIG. 8 is a block diagram illustrating an example business policy analyzer for business intent assurance and conflict detection and correction that may be implemented by the translation module of FIG. 2. In the example of FIG. 8, translation module 28 includes a stateless intent module 603 and an analytics node 605 as described in FIG. 6. Similar to business policy module 601, business policy module 801 includes unified graph 606 and assurance module 604.

However, business policy module 801 includes business policy analyzer and conflicts detection and correction 802 (or simply "analyzer with conflict correction 802"). Similar to business policy analyzer 602, analyzer with conflict correction 802 may be configured to inject logical packets into unified graph 606 to generate a stateless intent from a business intent. Moreover, analyzer with conflict correction 802 may be configured to detect the conflict and resolve a conflict as part of realization when new a business intent is being realized. For example, analyzer with conflict correction 802 may be configured to determine, using an abstract function at a node of a data structure, a first stateless intent is in conflict with the second stateless intent. In this example, analyzer with conflict correction 802 may be configured to resolve the second stateless intent into a third stateless intent using the abstract function. The abstract functions may, for example, be programmed by a human user.

Figure 9:
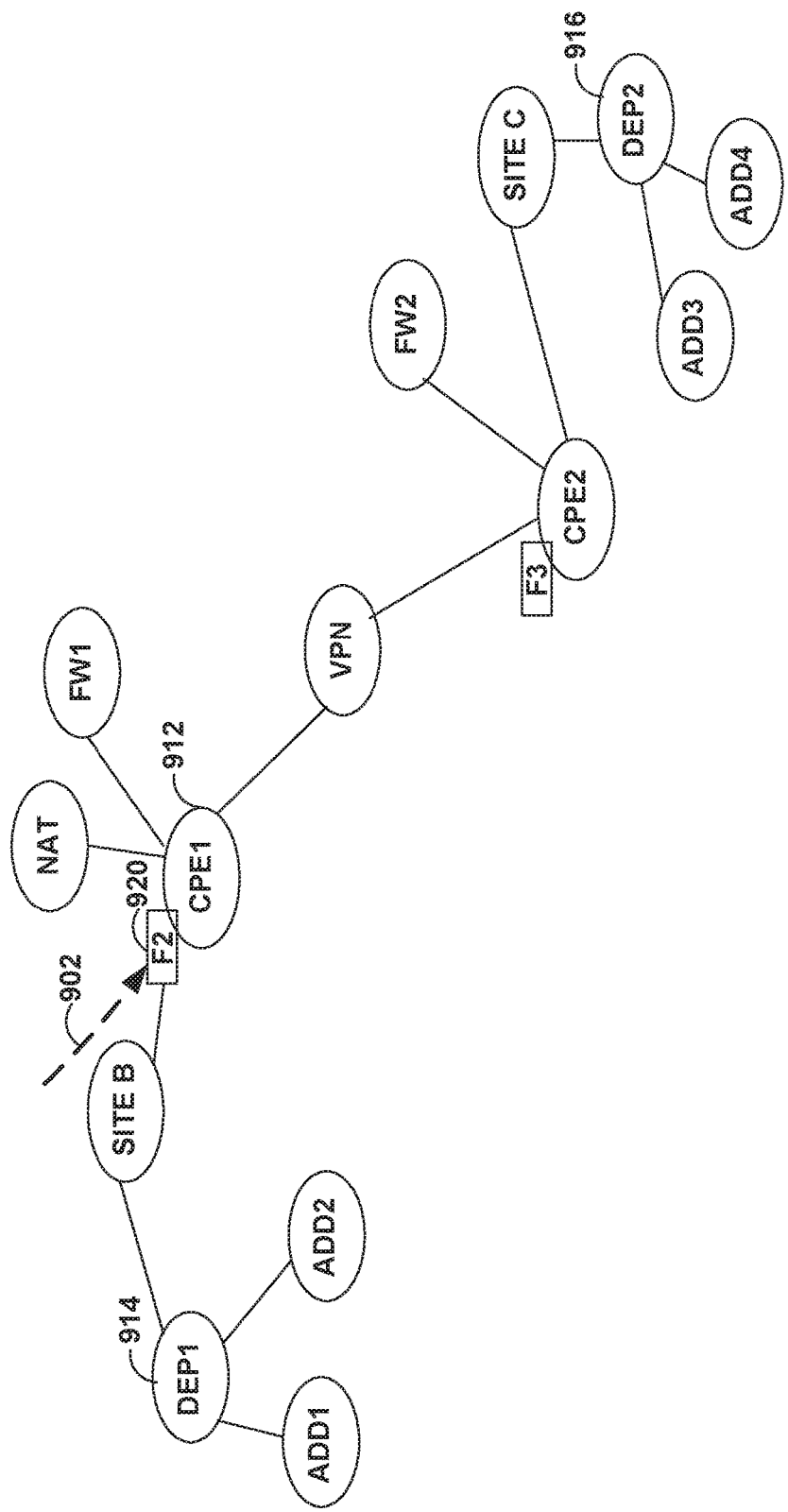
FIG. 9 is a block diagram illustrating an example graph model for conflict detection.

Analyzer with conflict correction 802 may generate a mapping from affected network elements of network elements 2 to the impacted business intents and provide remediation. In some examples, translation module 28 of FIG. 8 may represent a controller device configured to perform a method for stateful intent conflict detection comprising: receiving, for a data structure, an indication of a first stateful intent and a second stateful intent, the data structure including a plurality of nodes and a plurality of edges, each node of the plurality of nodes being representative of a respective network device of the plurality of network devices and the plurality of edges defining relationships between the plurality of nodes, determining, using an abstract function at a node of the data structure, the first stateless intent is in conflict with the second stateless intent, resolving the second stateless intent into a third stateless intent using the abstract function, generating low level configuration data for the plurality of network devices based on the first stateless intent and the third stateless intent, and interfacing, with one or more of the plurality of network devices to configure the one or more of the plurality of network devices with the low level configuration data. FIG. 9 is a block diagram illustrating an example graph model for conflict detection. As shown, the graph model of FIG. 9 may include paths across vertices along with actions and properties. The actions may include connect, allow, block, modify, and other actions.

In the example of FIG. 9, analyzer with conflict correction 802 injects a logical packet 902 to Customer-Premise Equipment (CPE) 912 with a first business intent. In this example, the first business intent of logical packet 902 includes an action to allow a file transfer protocol (FTP) connection from department 1 914 ("DEP1") to department 2 916 ("DEP2"), the corresponding network model is "Network model: CPE1-Allow {protocol: FTP, endpoints:*}."

In this example, logical packet 902 further includes a second business intent, which includes an action to allow FTP from Department 1912 to Department 2 914 for Address1, the corresponding network mode may be "Network model: CPE1-Allow {protocol: FTP, endpoints:Address1}." Moreover, logical packet 902 further includes a third business intent, which includes an action to apply static NAT for Address 1 in Site A 916, the corresponding network mode may be "Network model: CPE1-Modify {from: Address1, to: Address 2}."

In the example of FIG. 9, analyzer with conflict correction 802 applies the second business intent, the network model will be: CPE1-Allow {protocol: FTP, endpoints: Address1}. After applying the second business intent, analyzer with conflict correction 802 applies the third business intent. In this example, abstract function 920 takes logical packet 902 for applying a static NAT from the third business intent and checks if logical packet 902 is impacting any network flow. In this case, the third business intent of logical packet 902 conflicts with the second business intent of logical packet 902. As such, analyzer with conflict correction 802 may modify the second business intent corresponding firewall (FW) policy and the output may be to forward a policy with updated rule and output a NAT policy.

Analyzer with conflict correction 802 may be configured to get the action from logical packet 902 using function 920. If the action from logical packet 902 is to modify, analyzer with conflict correction 802 may check if the unified model 900 is impacted, get the business intent impacted with the current business intent, and call a resolve module with the logical packet and network model. If a user input is used to resolve, analyzer with conflict correction 802 may return the conflicted business intents and solution.

Analyzer with conflict correction 802 may be configured to perform a conflict resolve algorithm as follows. Analyzer with conflict correction 802 may get a logical packet and conflicted network model. If the conflict is resolved, by updating the conflicted network model, analyzer with conflict correction 802 may update the policy. If analyzer with conflict correction 802 is not able to resolve the conflict, analyzer with conflict correction 802 may generate the suggested solutions in terms of logical packet and generate the updated business intents and show to a user. For example, analyzer with conflict correction 802 may be configured to output a notification indicating an unresolved conflict has occurred in response to determining, using the abstract function, the stateless intent is in conflict with another stateless intent and cannot be resolved.

Figure 10:
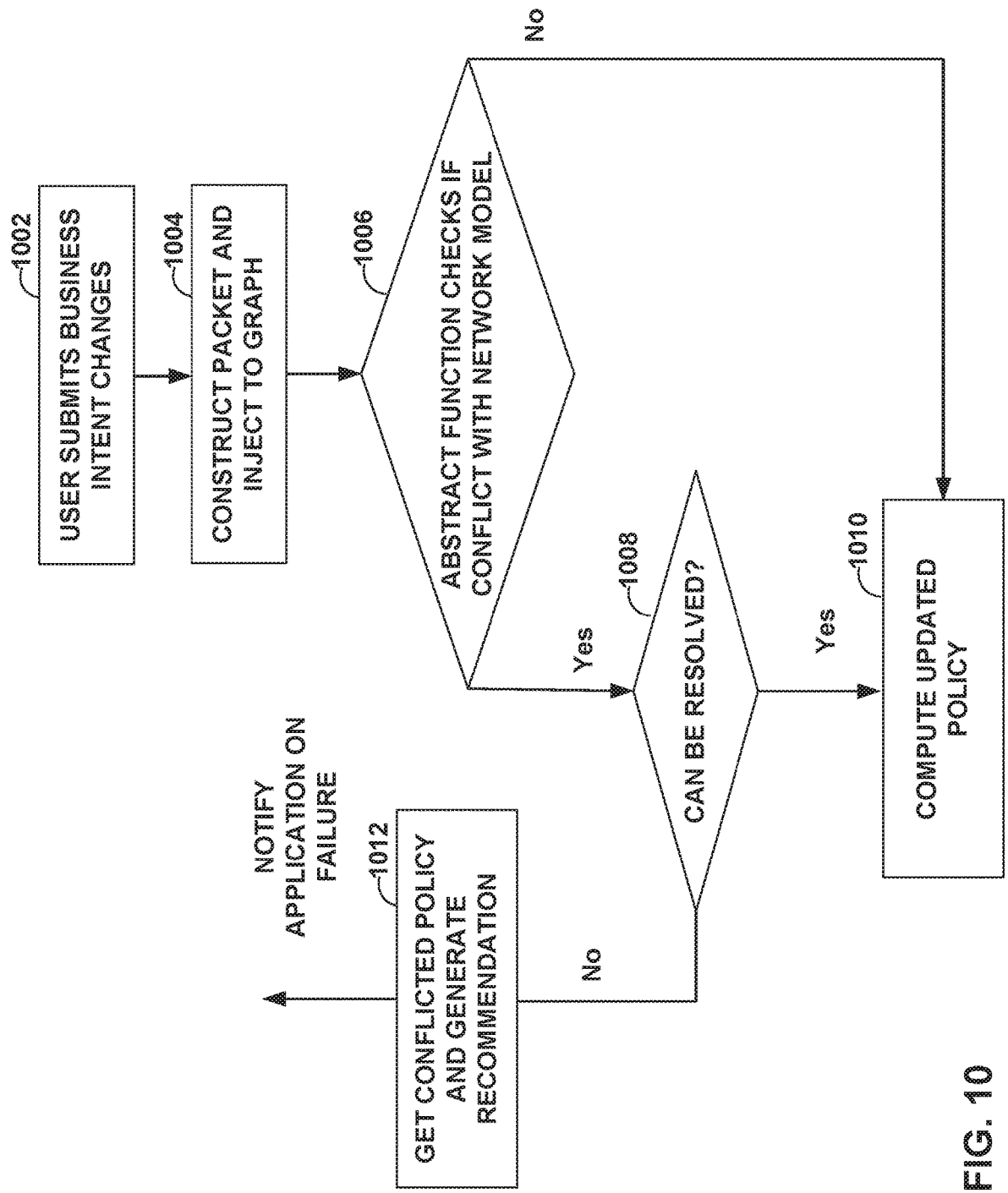
FIG. 10 is a block diagram illustrating an example process for business intent conflict detection and correction for a self-driving network.

FIG. 10 is a block diagram illustrating an example process for business intent conflict detection and correction for a self-driving network. In some examples, analyzer with conflict correction 802 may be configured to detect conflicts across business intents in translation and correct conflicts. In this way, analyzer with conflict correction 802 may be configured to detect the conflicts across business intents. When the intents are conflicting, analyzer with conflict correction 802 may be configured to automatically resolve the conflict and provide solution. Analyzer with conflict correction 802 may be configured to support an extension for the business policy models.

Techniques for business intent conflict detection and correction may be used in self-driving controllers to support business policies. Some solutions do not provide extensibility of the business policies. Some solutions do not support conflicts detection handling, if the end point groups are not overlapping. Some solutions do not provide the auto correction. The challenge with some solutions is the performance. There can be thousands of business intents across hierarchal groups. In such systems, the system may check all the intents which can be conflicting, as the analysis need to be done across all intents.

When the business intent is realized, analyzer with conflict correction 802 may be configured to build a network model. Business functions may be attached to the vertices aware of the existing model. When new business intent is being realized, analyzer with conflict correction 802 may detect the conflict and resolve the conflict as part of realization.

As shown in FIG. 10, analyzer with conflict correction 802 may receive a user submission of business intent changes (1002). Analyzer with conflict correction 802 may construct a logical packet and inject the logical packet to a graph (1004). Analyzer with conflict correction 802 may apply an abstract function (e.g. F1, F2, F3, etc.) that determines if a conflict with the network model exists (1006). In response to no conflict ("No" of step 1006), analyzer with conflict correction 802 computes an updated policy (1010).

In response, however, to a conflict, analyzer with conflict correction 802 determines whether the conflict can be resolved (1008). In response to determining that the conflict may be resolved ("Yes" of step 808), analyzer with conflict correction 802 resolves the conflict and computes an updated policy (1010). In response, however, to determining that the conflict may be not resolved ("No" of step 1008), analyzer with conflict correction 802 gets the conflicted policy, generates a recommendation, and notifies an application on failure (1012).

FIG. 10 illustrates an approach to detect the conflicts across business intents. When the intents are conflicting, analyzer with conflict correction 802 may automatically resolve the conflict and provide the solution. Analyzer with conflict correction 802 may support extension for the new business policy models. Such techniques for detecting conflicts may be used in all SDN controllers, orchestration systems, network management systems, or other systems. This may help to provide business policy support.

Some solutions do not provide generic state management for the policies. Such systems may suffer from state explosion. For example, as the business intent results in many endpoints, the state may be maintained for every endpoint.

Some solutions allow a developer to define groups that make all the endpoints belong to same group would be part of same state. This may not work in all scenarios, where every element in business policy lead to its unique state.

Figure 11:
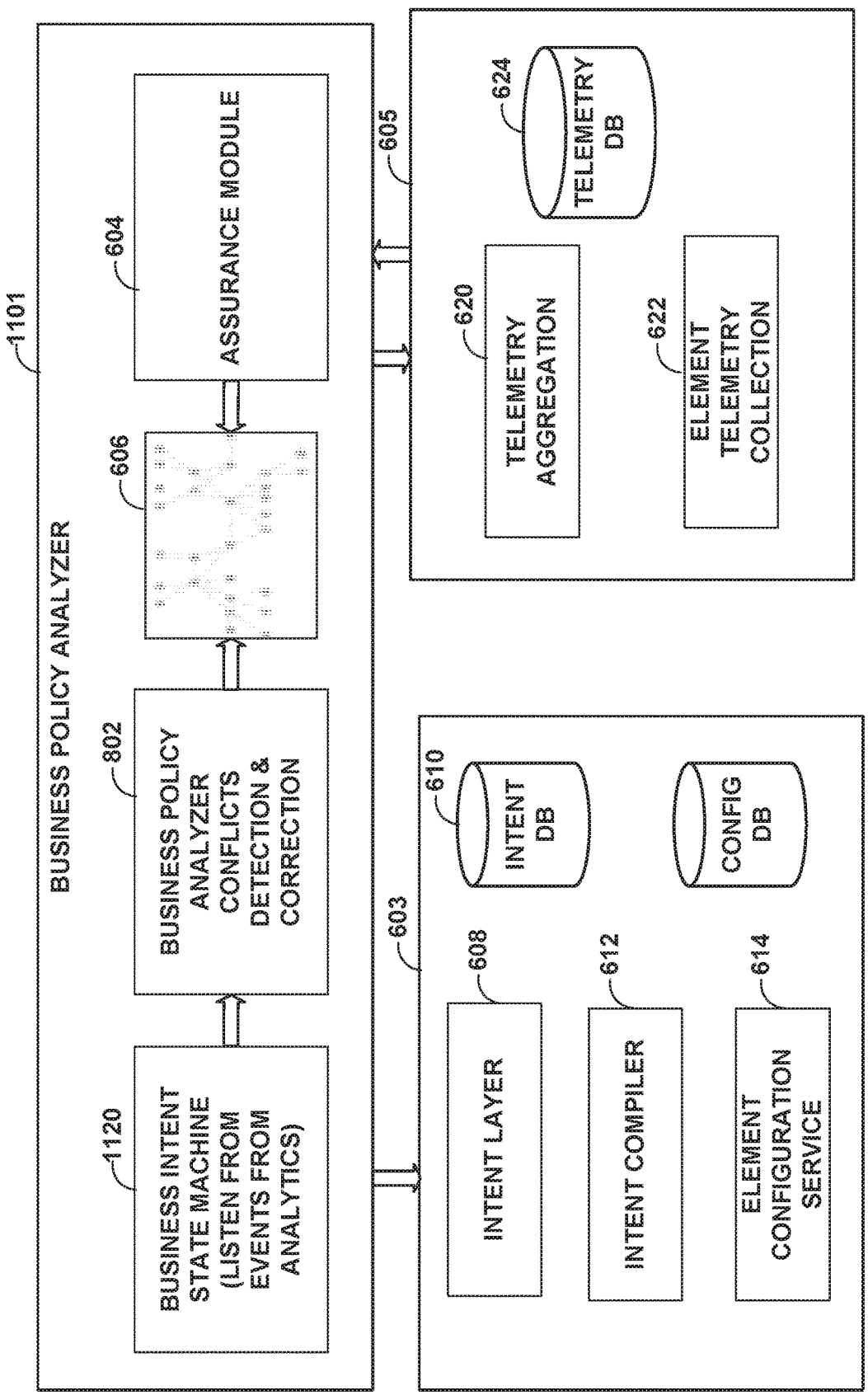
FIG. 11 is a block diagram illustrating an example business intent state manager that may be implemented by the translation module of FIG. 2.

FIG. 11 is a block diagram illustrating an example process for business intent state management. In the example of FIG. 11, translation module 28 includes stateless intent module 603 and analytics node 605 as described in FIG. 6. Similar to business policy module 801, business policy module 1101 includes analyzer with conflict correction 802, unified graph 606, and assurance module 604. However, business policy module 1101 further includes business intent state machine 1120.

Business intent state machine 1120 may be configured to work with analytics node 605 to run state management. For example, rather than individually programing a business intent between each endpoints of network 2, a human user may program a single intent specifying a condition and business intent state machine 1120 automatically generates a business intent between each endpoints of network 2 in response to events from analytics node 605. For instance, business intent state machine 1120 may check if there is a state that exists in any of the models with same endpoint group, derive a state and/or a policy from the model, and add the transition events between states. In this way, techniques for business intent state management may allow the plug ability of business intents, allow an approach to generate the states from business intent model, and allow an approach to manage the state for the business polices without "state explosion." Such techniques may be used in SDN controllers, orchestration systems, network management systems, or other systems. This may help to solve business policy support.

For example, business intent state machine 1120 may be configured to generate, based on the condition, a stateful intent for a data structure. In some examples, the condition is a time-based condition. For instance, business intent state machine 1120 may be configured to determine the time-based condition is satisfied and generate the stateful intent in response to determining the time-based condition is satisfied. In some examples, the condition is a recurring condition. For instance, business intent state machine 1120 may be configured to determine the recurring condition is satisfied and generate the stateful intent in response to determining the time-based condition is satisfied.

Business intent state machine 1120 may allow translation module 28 to manage the state of the business intent based on a model. Business intent state machine 1120 may determine the state trigger based on (a) conditions recurring or scheduled or (b) an event in network 2. Business intent state machine 1120 may automatically update the state model based on the business policy model. Business intent state machine 1120 may support extensibility of the business intents. Business intent state machine 1120 may register for event changes to an analytics module for events. In this way, business intent state machine 1120 may allow plug ability of the business intents. Techniques for business intent state management may generate the states from business intent model and provide an approach to manage the state for the business polices without "state explosion." As such, the techniques may be used in self-driving controllers to support business policies.

In some examples, translation module 28 of FIG. 11 may represent a controller device configured to perform a method for generating stateless intents, the method comprising: receiving a condition for a policy to operate the plurality of network devices, generating, based on the condition, a stateful intent for a data structure, the data structure including a plurality of nodes and a plurality of edges, each node of the plurality of nodes being representative of a respective network device of the plurality of network devices and the plurality of edges defining relationships between the plurality of nodes, determining, using an abstract function configured at a node of the plurality of nodes, a stateless intent for implementing the stateful intent, and interfacing, with one or more of the plurality of network devices to configure the one or more of the plurality of network devices using the stateful intent.

Figure 12:
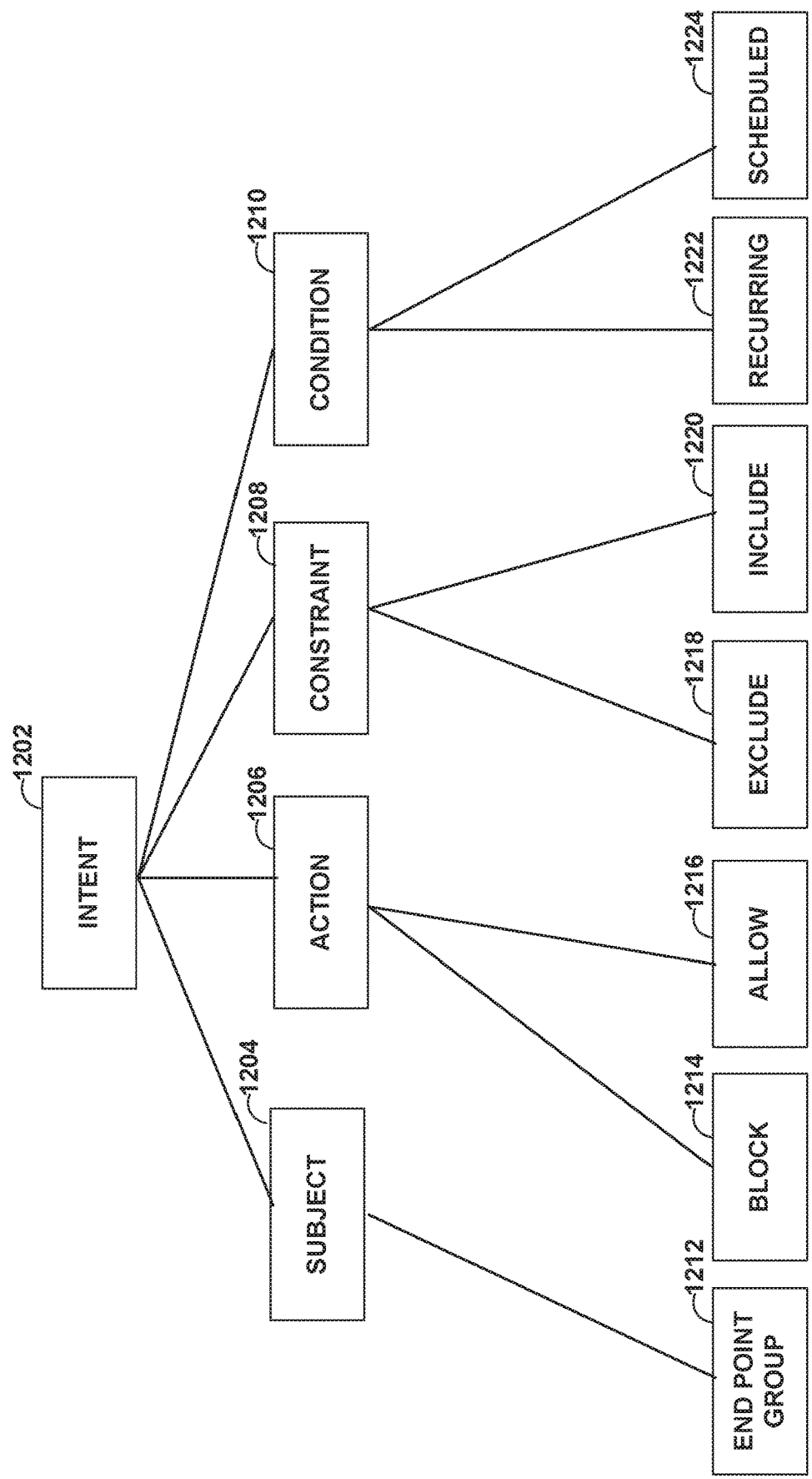
FIG. 12 is a block diagram illustrating an example intent state.

FIG. 12 is a block diagram illustrating an example intent state. For example, intent 1202 may include subject 1204, action 1206, constraint 1208, and condition 1210. Subject 1204 may include end point group 1212. Action 1206 may include block 1214 and allow 1216. Constraint 1208 may include exclude 1218 and include 1220. Condition 1210 may include condition types recurring 1222 and scheduled 1224. Business intents may include the conditions. The conditions may be time based scheduled or recurring.

Figure 13:
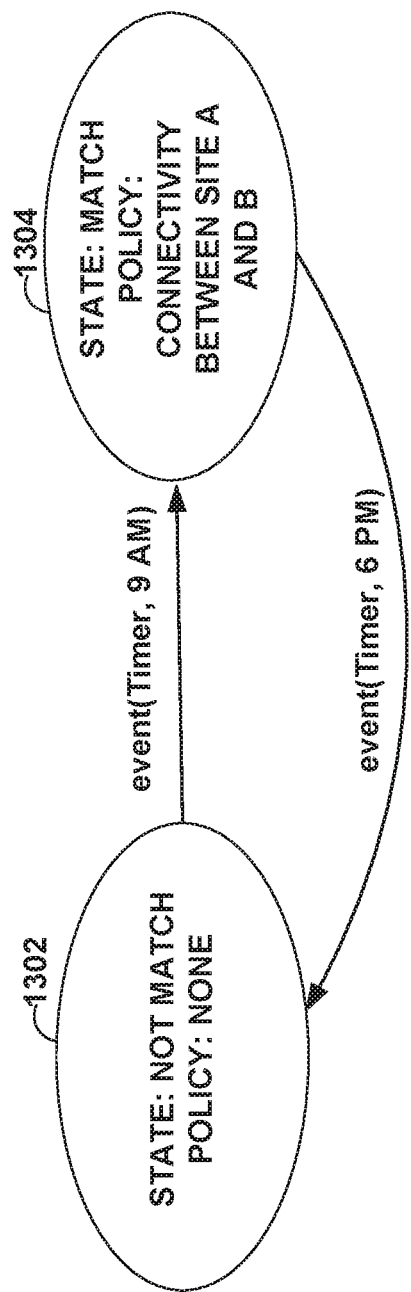
FIG. 13 is a block diagram illustrating an example of time-based conditions.

FIG. 13 is a block diagram illustrating an example of a time-based condition. In the example of FIG. 13, first state 1302 is when there is no match with no policy and second state 1304 is when there is a match with a policy to connect between site A and site B. For example, business intent state machine 1120 may generate a business intent specifying 10 Mbps connecting site A and site B when analytics node 605 determines an event specified by a human user for the business intent is satisfied (e.g., the timer is between 9 AM to 6 PM). In this example, analyzer with conflict correction 802 may inject a logical packet indicating the business intent specified by business intent state machine 1120 to allow management of the state of network 2 for business polices without "state explosion."

Figure 14:
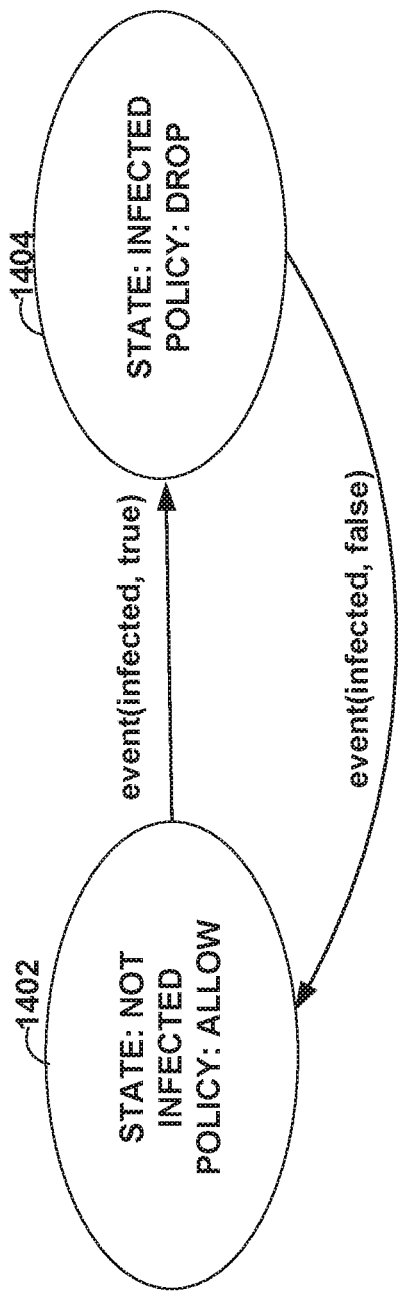
FIG. 14 is a block diagram illustrating an example of a recurring condition.

FIG. 14 is a block diagram illustrating an example of a recurring condition. Business intents can include the conditions based on events. In the example of FIG. 14, first state 1402 is when not infected with a policy of allow and second state 1404 is when infected with a policy of drop. For example, business intent state machine 1120 may generate a business intent to drop logical packets when an event specified by a human user for the business intent is satisfied (e.g., a department is infected). Business intent state machine 1120 may expand the state diagram when new intent models are defined. For example, when infected, but the address is from a first office, business intent state machine 1120 may have dedicated policy.

In this example, business intent state machine 1120 may cause analyzer with conflict correction 802 to inject a logical packet indicating the business intent specified by business intent state machine 1120 to allow management of the state of network 2 for business polices without "state explosion."

In some examples, business intent state machine 1120 may include an interface with analytics node 605 to enable the monitoring for the required properties on resources, to configure the events on analytics node 605 for thresholds, and to listen for the threshold crossing events and run the state management. In this way, translation module 28 may address state explosion such that there can many endpoints resolved from the business intent, every endpoint can result its own state, and a system should maintain one record for every state. A group may have a reference to one among the state and a violated endpoint may be referring to a state of the endpoint.

Figure 15:
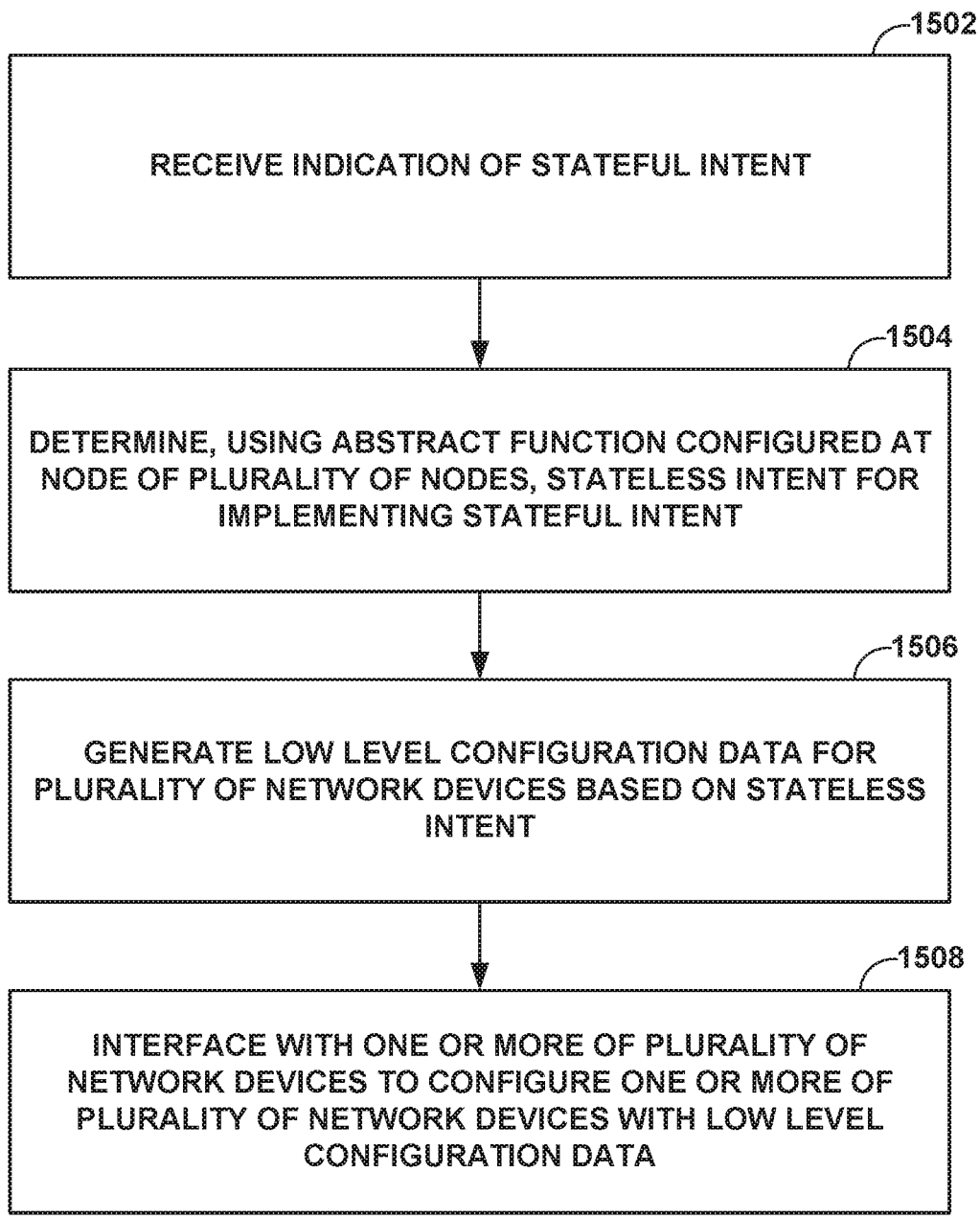
FIG. 15 is a flowchart illustrating an example process for determining a stateless intent, according to techniques of this disclosure.

FIG. 15 is a flowchart illustrating an example process for determining a stateless intent for implementing the stateful intent, according to techniques of this disclosure. FIG. 15 is discussed with respect to FIGS. 1-14 for example purposes only. Controller device 10 may receive an indication of a stateful intent (1502). The data structure may include a plurality of nodes and a plurality of edges, each node of the plurality of nodes being representative of a respective network device of a plurality of network devices (e.g., elements 14 of FIG. 1) and the plurality of edges defining relationships between the plurality of nodes. In some examples, the data structure is a unified graph model. The stateful intent may, for example, indicate a bandwidth between two network devices of the plurality of network devices. In some examples, the stateful intent may indicate one or more of a virtual private network connection between two network devices of the plurality of network devices, a labeled switch path between the two network devices of the plurality of network devices, an optical path between the two network devices of the plurality of network devices, or another stateful intent.

Controller device 10 may determine, using an abstract function configured at a node of the plurality of nodes, a stateless intent for implementing the stateful intent (1504). The stateful intent may be preprogrammed by a human user. For example, controller device 10 may generate a logical packet based on the stateful intent, inject the logical packet into the data structure and traverse the logical packet along the plurality of nodes. In some examples, traversing the logical packet comprises applying the abstract function to the logical packet when the logical packet traverses the node.

To determine the stateless intent, controller device 10 may determine a role assigned to the node and determine the stateless intent based on the role assigned to the node. For instance, controller device 10 may determine that a node is assigned as a core device and may determine the stateless intent based on the node being assigned as a core device. In some examples, controller device 10 may generate the logical packet to indicate an action. Examples of action may include one or more of connect, allow, block, or another action. For example, controller device 10 may be configured to select EVPN using Table 2 in response to determining a node (e.g., D2) has a label of "datacenter edge" and a logical packet indicating an action of "connectivity." A role may include one or more of a datacenter edge device, an edge device, a layer 2 (L2) network device, or another role. Controller device 10 may generate the logical packet to indicate a source node of the plurality of nodes and a destination node of the plurality of nodes. In some examples, controller device 10 may generate the logical packet to indicate a quality of service (e.g., a bandwidth, latency, etc.).

To determine the stateless intent, controller device 10 may determine a dependent logical packet using an abstract function and a logical packet and inject the dependent logical packet towards a next node of the data structure representative of a next network device of the plurality of network devices. As shown in the example of FIG. 4, controller device 10 may apply instructions of abstract function F2 that generate RSVP LSP 414 and VPN 416 between site B and site A and generate a dependent logical packet 404 that traverses RSVP LSP 414 and VPN 416 to device D1, in response to logical packet 402. When logical packet 404 reaches device D1, translation module 28 may apply instructions of abstract function F1 that generate RSVP LSP 418 and VPN 420 between site A and site C, in response to logical packet 404.

Controller device 10 may generate low level configuration data for the plurality of network devices based on the stateless intent (1506). For example, controller 10 may generate, based on the stateless intent, low-level configuration data for element 14A in a first vender-specific language supported by element 14A and low-level configuration data for element 14B in a second vender-specific language supported by element 14B and not supported by element 14A. Controller device 10 may interface with one or more of the plurality of network devices to configure the one or more of the plurality of network devices with the low level configuration data (e.g., device-level) (1508). For example, controller device 10 may apply the low-level configuration data for element 14A to element 14A and apply the low-level configuration data for element 14B to element 14B.

The techniques described in this disclosure may be implemented, at least in part, in hardware, software, firmware or any combination thereof. For example, various aspects of the described techniques may be implemented within one or more processors, including one or more microprocessors, DSPs, ASICs, FPGAs, or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
  receiving, by a controller device that manages a plurality of network devices and for a data structure, an indication of a stateful intent, the data structure including a plurality of nodes and a plurality of edges, each node of the plurality of nodes being representative of a respective network device of the plurality of network devices and the plurality of edges defining relationships between the plurality of nodes;

determining, by the controller device, using an abstract function configured at a node of the plurality of nodes, a stateless intent for implementing the stateful intent;

generating, by the controller device, low level configuration data for the plurality of network devices based on the stateless intent; and interfacing, by the controller device, with one or more of the plurality of network devices to configure the one or more of the plurality of network devices with the low level configuration data.

2. The method of claim 1, wherein determining the stateless intent comprises:
generating a logical packet based on the stateful intent;
injecting the logical packet into the data structure; and
traversing the logical packet along the plurality of nodes, wherein traversing the logical packet comprises applying the abstract function to the logical packet when the logical packet traverses the node.

3. The method of claim 2, wherein determining the stateless intent comprises:
determining a role assigned to the node; and
determining the stateless intent based on the role assigned to the node.

4. The method of claim 3, wherein the role comprises one or more of a datacenter edge device, an edge device, or a layer 2 (L2) network device.

5. The method of claim 2, wherein determining the stateless intent comprises:
determining a dependent logical packet using the abstract function and the logical packet; and
injecting the dependent logical packet towards a next node of the data structure representative of a next network device of the plurality of network devices.

6. The method of claim 2, wherein generating the logical packet comprises generating the logical packet to indicate an action, the action comprising one or more of connect, allow, or block.

7. The method of claim 2, wherein generating the logical packet comprises generating the logical packet to indicate a source node of the plurality of nodes and a destination node of the plurality of nodes.

8. The method of claim 2, wherein generating the logical packet comprises generating the logical packet to indicate a quality of service.

9. The method of claim 1, wherein the stateful intent indicates a bandwidth between two network devices of the plurality of network devices.

10. The method of claim 1, wherein the stateless intent indicates one or more of:
a virtual private network connection between two network devices of the plurality of network devices;
a labeled switch path between the two network devices of the plurality of network devices; or
an optical path between the two network devices of the plurality of network devices.

11. The method of claim 1, wherein the abstract function is preprogrammed by a human user.

12. The method of claim 1, wherein the data structure is a unified graph model.

13. A controller device that manages a plurality of network devices, the controller device comprising one or more processing units implemented in circuitry and configured to:

receive, for a data structure, an indication of a stateful intent, the data structure including a plurality of nodes and a plurality of edges, each node of the plurality of nodes being representative of a respective network device of the plurality of network devices and the plurality of edges defining relationships between the plurality of nodes;

determine, using an abstract function configured at a node of the plurality of nodes, a stateless intent for implementing the stateful intent;

generate low level configuration data for the plurality of network devices based on the stateless intent; and interface with one or more of the plurality of network devices to configure the one or more of the plurality of network devices with the low level configuration data.

14. The controller device of claim 13, wherein, to determine the stateless intent, the one or more processing units are configured to:
generate a logical packet based on the stateful intent;
inject the logical packet into the data structure; and
traverse the logical packet along the plurality of nodes, wherein, to traverse the logical packet, the one or more processing units are configured to apply the abstract function to the logical packet when the logical packet traverses the node.

15. The controller device of claim 14, wherein, to determine the stateless intent, the one or more processing units are configured to:
determine a role assigned to the node; and
determine the stateless intent based on the role assigned to the node.

16. The controller device of claim 15, wherein the role comprises one or more of a datacenter edge device, an edge device, or a layer 2 (L2) network device.

17. The controller device of claim 14, wherein, to determine the stateless intent, the one or more processing units are configured to:
determine a dependent logical packet using the abstract function and the logical packet; and
inject the dependent logical packet towards a next node of the data structure representative of a next network device of the plurality of network devices.

18. The controller device of claim 14, wherein, to generate the logical packet, the one or more processing units are configured to generate the logical packet to indicate an action, the action comprising one or more of connect, allow, or block.

19. The controller device of claim 14, wherein, to generate the logical packet, the one or more processing units are configured to generate the logical packet to indicate a source node of the plurality of nodes and a destination node of the plurality of nodes.

20. A computer-readable storage medium having stored thereon instructions that, when executed, cause a processor of a controller device that manages a plurality of network devices to:

receive, for a data structure, an indication of a stateful intent, the data structure including a plurality of nodes and a plurality of edges, each node of the plurality of nodes being representative of a respective network device of the plurality of network devices and the plurality of edges defining relationships between the plurality of nodes;

determine, using an abstract function configured at a node of the plurality of nodes, a stateless intent for implementing the stateful intent;

generate low level configuration data for the plurality of network devices based on the stateless intent; and
interface with one or more of the plurality of network devices to configure the one or more of the plurality of network devices with the low level configuration data.

* * * * *